(12) United States Patent
Fukasawa et al.

(10) Patent No.: US 12,738,832 B2
(45) Date of Patent: Sep. 15, 2026

(54) MULTILEVEL POWER CONVERSION SYSTEM, AND CIRCUITRY OF MULTILEVEL POWER CONVERSION SYSTEM

(71) Applicant: TMEIC CORPORATION, Tokyo (JP)

(72) Inventors: Issei Fukasawa, Tokyo (JP); Tomoya Katsukura, Tokyo (JP); Masahiro Kinoshita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 111 days.

(21) Appl. No.: 18/866,910

(22) PCT Filed: Apr. 18, 2023

(86) PCT No.: PCT/JP2023/015513
§ 371 (c)(1),
(2) Date: Nov. 18, 2024

(87) PCT Pub. No.: WO2024/218876
PCT Pub. Date: Oct. 24, 2024

(65) Prior Publication Data

US 2025/0357841 A1 Nov. 20, 2025

(51) Int. Cl.
*H02M 1/00* (2007.01)
*H02H 3/22* (2006.01)
(Continued)

(52) U.S. Cl.
CPC .......... *H02M 1/0032* (2021.05); *H02M 1/32* (2013.01); *H02M 7/487* (2013.01);
(Continued)

(58) Field of Classification Search
CPC .... H02M 1/0032; H02M 1/088; H02M 7/487; H02M 7/53873; H02M 1/0009;
(Continued)

(56) References Cited

U.S. PATENT DOCUMENTS

2015/0200602 A1* 7/2015 Narimani ............ H02M 5/4585 363/37
2016/0006368 A1* 1/2016 Kusuno ............... H02M 7/5395 363/131

(Continued)

FOREIGN PATENT DOCUMENTS

EP 3413456 B1 * 9/2020 ............ H02M 7/483
JP 2011061883 A 3/2011

(Continued)

OTHER PUBLICATIONS

Office Action dated Mar. 10, 2026 in corresponding JP patent application No. 2025-514940 (7 pages; with English translation).
International Search Report and Written Opinion issued Jun. 6, 2023 in PCT/JP2023/015513 filed on Apr. 18, 2023 (with English translation of Search Report), 11 pages.

*Primary Examiner* — Crystal L Hammond
*Assistant Examiner* — Nicolas Alden Chapa Mills
(74) *Attorney, Agent, or Firm* — XSENSUS LLP

(57) ABSTRACT

A system for preventing semiconductor elements of a power converter from breaking down due to an overvoltage by a lightning surge in a multilevel power conversion system is provided. The multilevel power conversion system includes a multilevel power converter, and a controller that includes an operation control unit that causes an operation mode of the multilevel power converter to transition to a standby mode in which power conversion is not performed between a DC input/output unit and an AC input/output unit based on a predetermined condition, and a gate signal generation unit that generates and outputs a gate signal that puts at least one of a third semiconductor switching element or a second semiconductor switching element into a conducting state or a switching state in the standby mode.

6 Claims, 24 Drawing Sheets

(51) Int. Cl.

| | |
|---|---|
| ***H02H 7/122*** | (2006.01) |
| ***H02H 9/04*** | (2006.01) |
| ***H02M 1/32*** | (2007.01) |
| ***H02M 7/487*** | (2007.01) |
| ***H02M 7/5387*** | (2007.01) |

(52) U.S. Cl.
CPC .......... *H02M 7/53873* (2013.01); *H02H 3/22* (2013.01); *H02H 7/122* (2013.01); *H02H 9/041* (2013.01); *H02M 1/0009* (2021.05)

(58) Field of Classification Search
CPC ......... H02M 1/007; H02M 1/32; Y02B 70/10; H02H 3/22; H02H 7/122; H02H 9/04; H02H 9/041
See application file for complete search history.

(56) References Cited

U.S. PATENT DOCUMENTS

| | | | | |
|---|---|---|---|---|
| 2021/0249970 | A1* | 8/2021 | Pieschel .............. | H02M 1/0012 |
| 2022/0255419 | A1* | 8/2022 | Tsuruta ............... | H02M 1/0009 |

FOREIGN PATENT DOCUMENTS

| | | | | |
|---|---|---|---|---|
| JP | 2013-116020 | A | | 6/2013 |
| JP | 2019-24290 | A | | 2/2019 |
| JP | 2019024290 | A | * | 2/2019 |

* cited by examiner

FIG.1

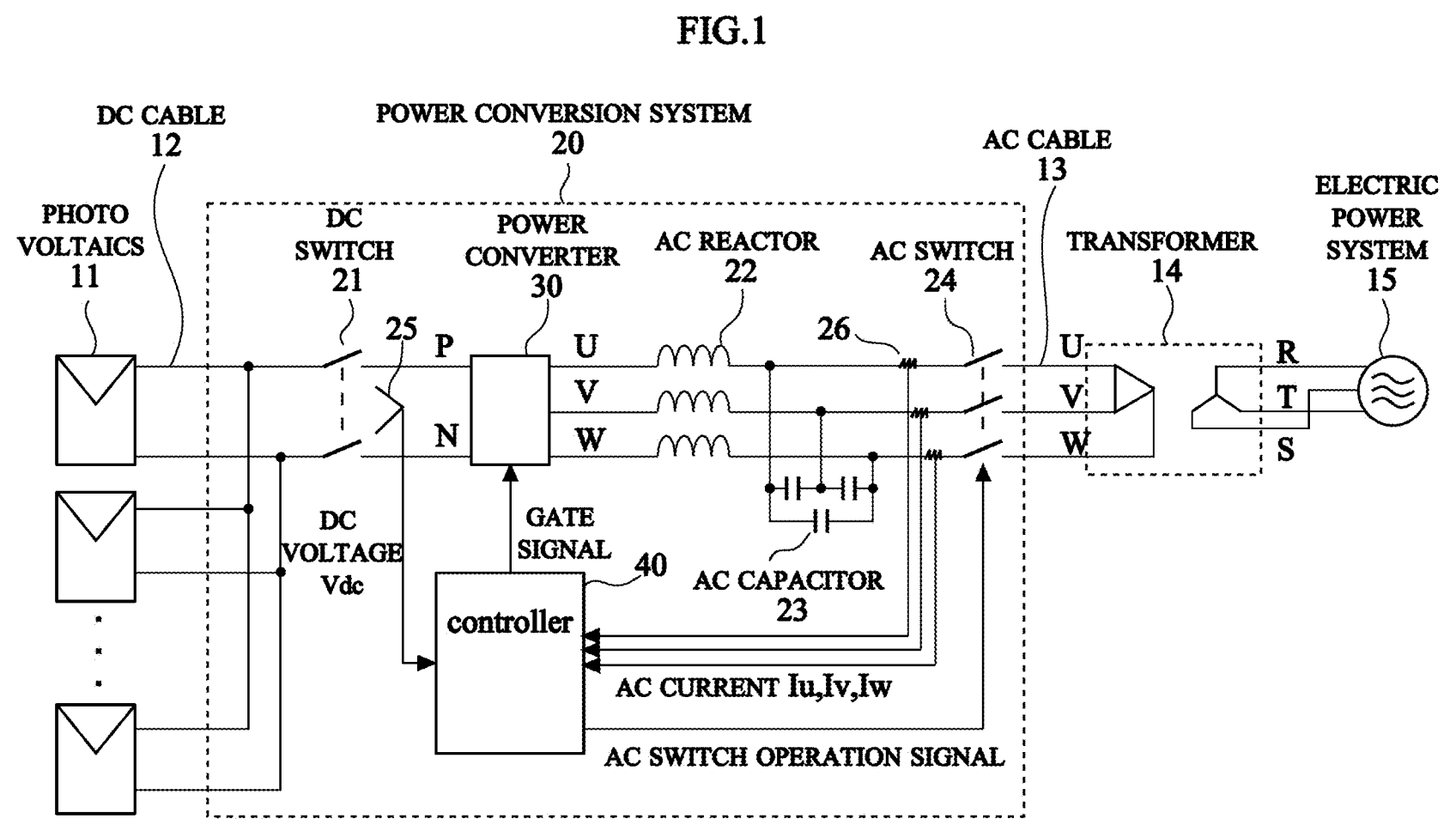

ELECTRIC POWER SYSTEM 15
R
T
S
TRANSFORMER 14
AC CABLE 13
U
V
W
AC SWITCH 24
26
AC CAPACITOR 23
AC REACTOR 22
AC CURRENT Iu,Iv,Iw
AC SWITCH OPERATION SIGNAL
POWER CONVERSION SYSTEM 20
POWER CONVERTER 30
U
V
W
40
GATE SIGNAL
controller
P
N
DC SWITCH 21
25
DC VOLTAGE Vdc
DC CABLE 12
PHOTO VOLTAICS 11

CIRCUIT CONFIGURATION EXAMPLE OF POWER CONVERTER (CIRCUIT DIAGRAM)

CIRCUIT CONFIGURATION EXAMPLE OF POWER CONVERTER (REAL WIRING DIAGRAM)

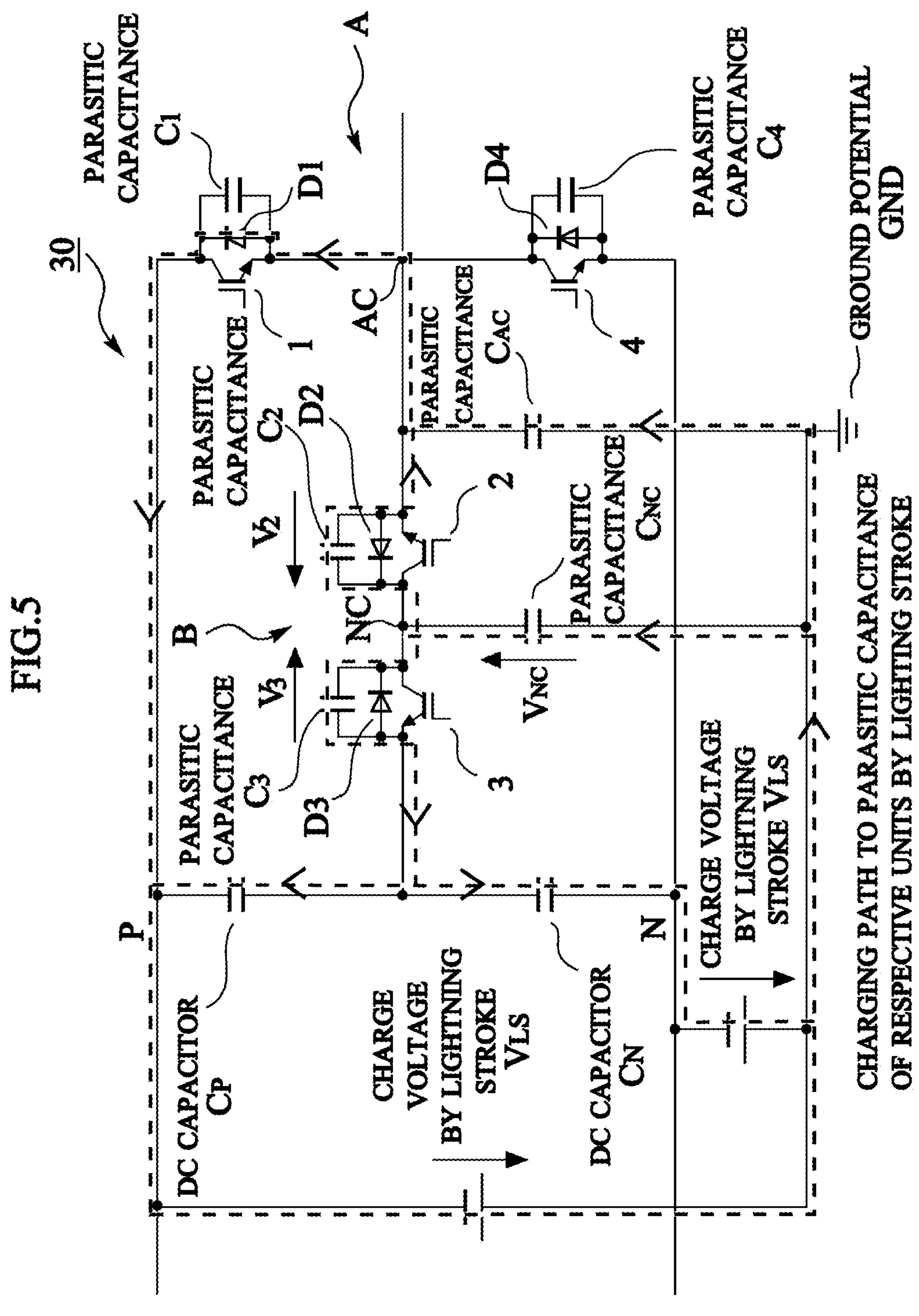
FIG.5
30
PARASITIC CAPACITANCE
C1
D1
A
AC
1
PARASITIC CAPACITANCE
C2
D2
2
PARASITIC CAPACITANCE
CAC
PARASITIC CAPACITANCE
C4
D4
4
GROUND POTENTIAL
GND
V2
B
NC
V3
VNC
PARASITIC CAPACITANCE
CNC
PARASITIC CAPACITANCE
C3
D3
3
P
N
DC CAPACITOR
CP
CHARGE VOLTAGE BY LIGHTNING STROKE VLS
DC CAPACITOR
CN
CHARGE VOLTAGE BY LIGHTNING STROKE VLS
CHARGING PATH TO PARASITIC CAPACITANCE OF RESPECTIVE UNITS BY LIGHTING STROKE 30
VNC = (C2+C3) / (CNC+C2+C3) VLS
V2 = V3 = CNC / (CNC+C2+C3) VLS
PARASITIC CAPACITANCE CNC
C3
PARASITIC CAPACITANCE C2
PARASITIC CAPACITANCE CAC
CHARGE VOLTAGE BY LIGHTNING STROKE VLS
EQUIVALENT CIRCUIT OF CHARGING PATH

FIG.7

| | CONNECTION PORTIONS OF DIODES OF TWO NEUTRAL POINT ELEMENTS | |
|---|---|---|
| | ANODE SIDE | CATHODE SIDE |
| CASE WHERE DC P, N OR AC SIDE IS CHARGED WITH POSITIVE POLARITY | THERE IS A POSSIBILITY THAT PARASITIC CAPACITANCES OF SEMICONDUCTOR ELEMENTS ARE CHARGED, AND BREAKDOWN DUE TO OVERVOLTAGE MAY OCCUR | PARASITIC CAPACITANCES OF SEMICONDUCTOR ELEMENTS ARE NOT CHARGED, AND BREAKDOWN DUE TO OVERVOLTAGE OF SEMICONDUCTOR ELEMENTS DO NOT OCCUR |
| CASE WHERE DC P, N OR AC SIDE IS CHARGED WITH NEGATIVE POLARITY | PARASITIC CAPACITANCES OF SEMICONDUCTOR ELEMENTS ARE NOT CHARGED, AND BREAKDOWN DUE TO OVERVOLTAGE OF SEMICONDUCTOR ELEMENTS DO NOT OCCUR | THERE IS A POSSIBILITY THAT PARASITIC CAPACITANCES OF SEMICONDUCTOR ELEMENTS ARE CHARGED, AND BREAKDOWN DUE TO OVERVOLTAGE MAY OCCUR |

EQUIVALENT CIRCUIT OF CHARGING PATH IN A CASE WHERE SEMICONDUCTOR ELEMENT 2 IS PUT INTO ON STATE

Figure 11:
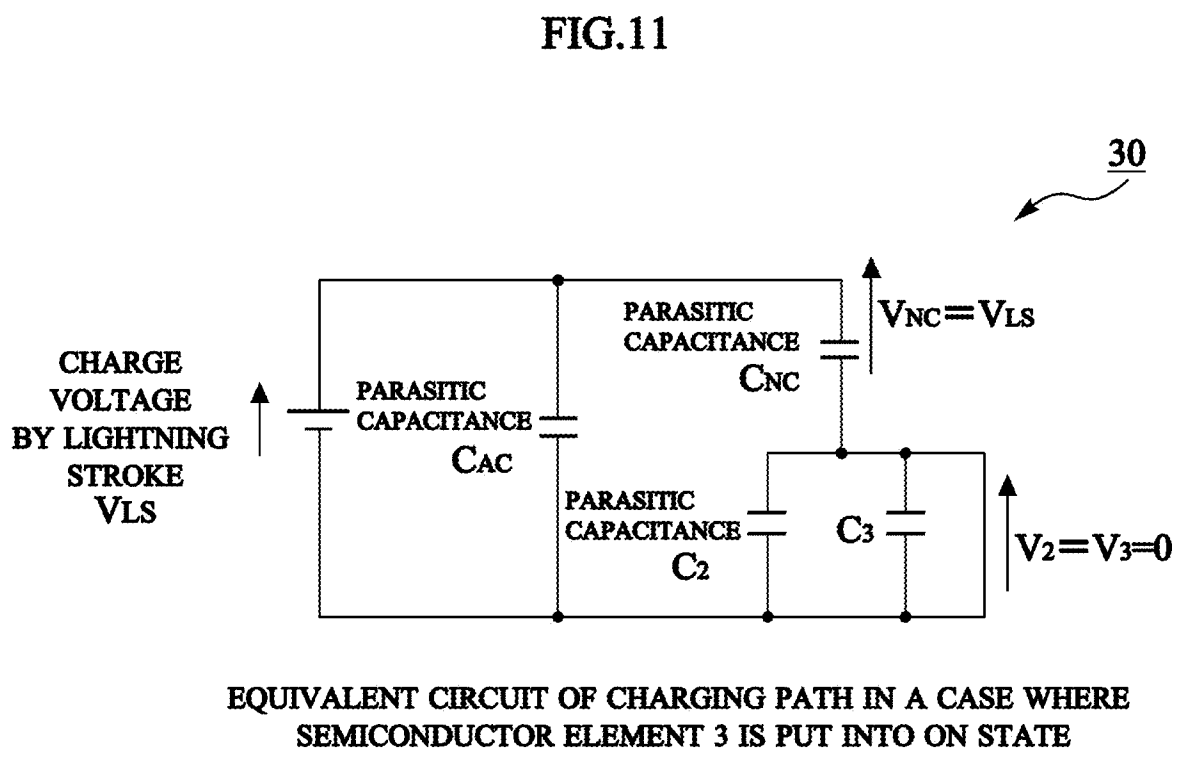

CHARGE VOLTAGE BY LIGHTNING STROKE $V_{LS}$

PARASITIC CAPACITANCE $C_{AC}$

PARASITIC CAPACITANCE $C_{NC}$

PARASITIC CAPACITANCE $C_2$ $C_3$ $V_{NC} = V_{LS}$ $V_2 = V_3 = 0$

EQUIVALENT CIRCUIT OF CHARGING PATH IN A CASE WHERE SEMICONDUCTOR ELEMENT 3 IS PUT INTO ON STATE

Figure 14:
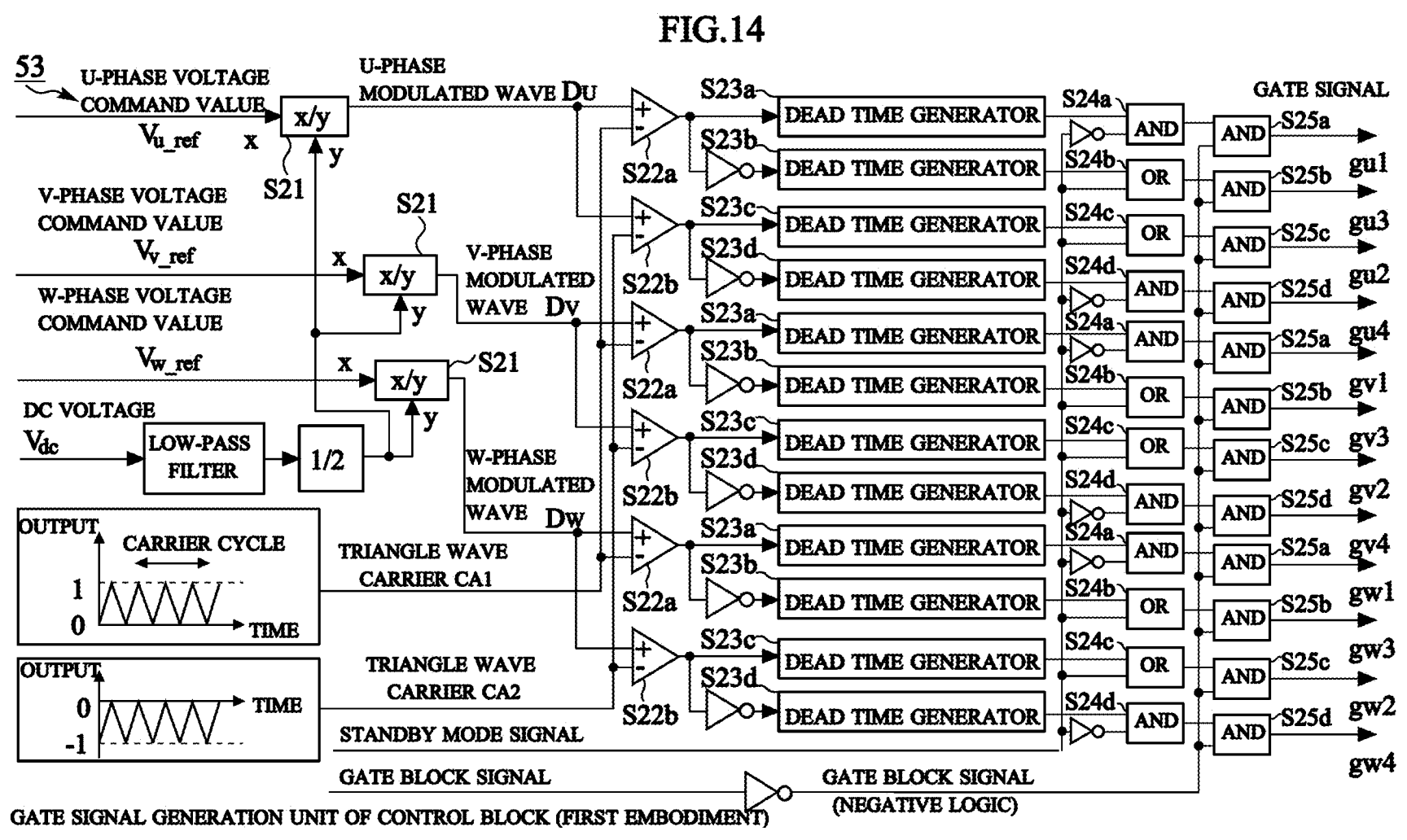

53
U-PHASE VOLTAGE COMMAND VALUE
$V_{u\_ref}$
x
y
x/y
S21
V-PHASE VOLTAGE COMMAND VALUE
$V_{v\_ref}$
W-PHASE VOLTAGE COMMAND VALUE
$V_{w\_ref}$
DC VOLTAGE
$V_{dc}$
LOW-PASS FILTER
1/2
U-PHASE MODULATED WAVE Du
V-PHASE MODULATED WAVE Dv
W-PHASE MODULATED WAVE Dw
OUTPUT
CARRIER CYCLE
1
0
TIME
TRIANGLE WAVE CARRIER CA1
OUTPUT
0
-1
TIME
TRIANGLE WAVE CARRIER CA2
STANDBY MODE SIGNAL
GATE BLOCK SIGNAL
GATE BLOCK SIGNAL (NEGATIVE LOGIC)
S22a
S22b
S23a
S23b
S23c
S23d
DEAD TIME GENERATOR
S24a
S24b
S24c
S24d
AND
OR
S25a
S25b
S25c
S25d
GATE SIGNAL
gu1
gu3
gu2
gu4
gv1
gv3
gv2
gv4
gw1
gw3
gw2
gw4

GATE SIGNAL GENERATION UNIT OF CONTROL BLOCK (FIRST EMBODIMENT)

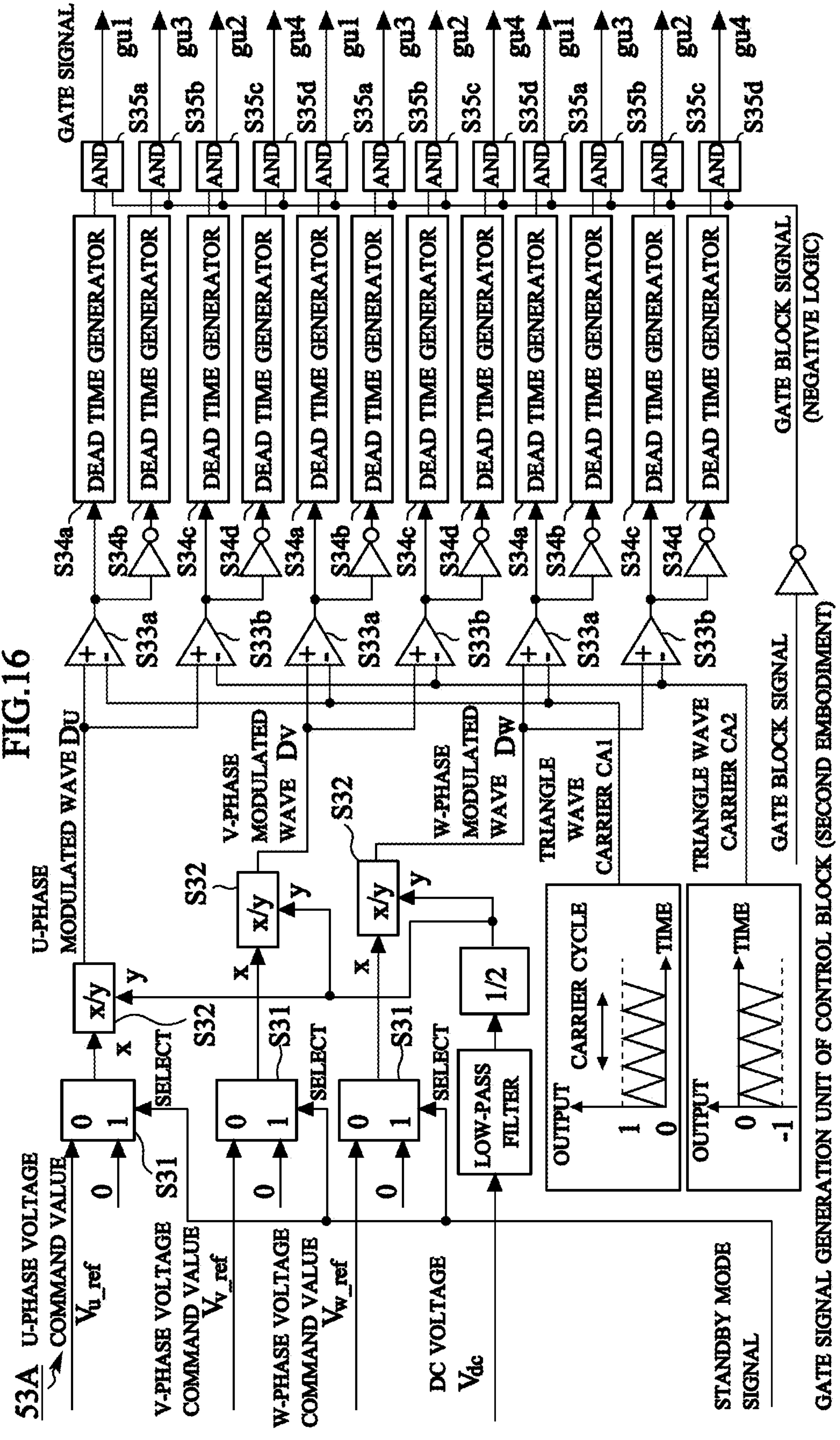
FIG.16
53A
U-PHASE VOLTAGE COMMAND VALUE $V_{u\_ref}$
V-PHASE VOLTAGE COMMAND VALUE $V_{v\_ref}$
W-PHASE VOLTAGE COMMAND VALUE $V_{w\_ref}$
DC VOLTAGE $V_{dc}$
STANDBY MODE SIGNAL
SELECT
S31
S32
x/y
LOW-PASS FILTER
1/2
U-PHASE MODULATED WAVE Du
V-PHASE MODULATED WAVE Dv
W-PHASE MODULATED WAVE Dw
TRIANGLE WAVE CARRIER CA1
TRIANGLE WAVE CARRIER CA2
CARRIER CYCLE
OUTPUT
TIME
GATE BLOCK SIGNAL
S33a
S33b
S34a
S34b
S34c
S34d
DEAD TIME GENERATOR
AND
S35a
S35b
S35c
S35d
GATE SIGNAL
gu1
gu3
gu2
gu4
GATE BLOCK SIGNAL (NEGATIVE LOGIC)
GATE SIGNAL GENERATION UNIT OF CONTROL BLOCK (SECOND EMBODIMENT)

VOLTAGE COMMAND GENERATION UNIT OF CONTROL BLOCK (THIRD EMBODIMENT)

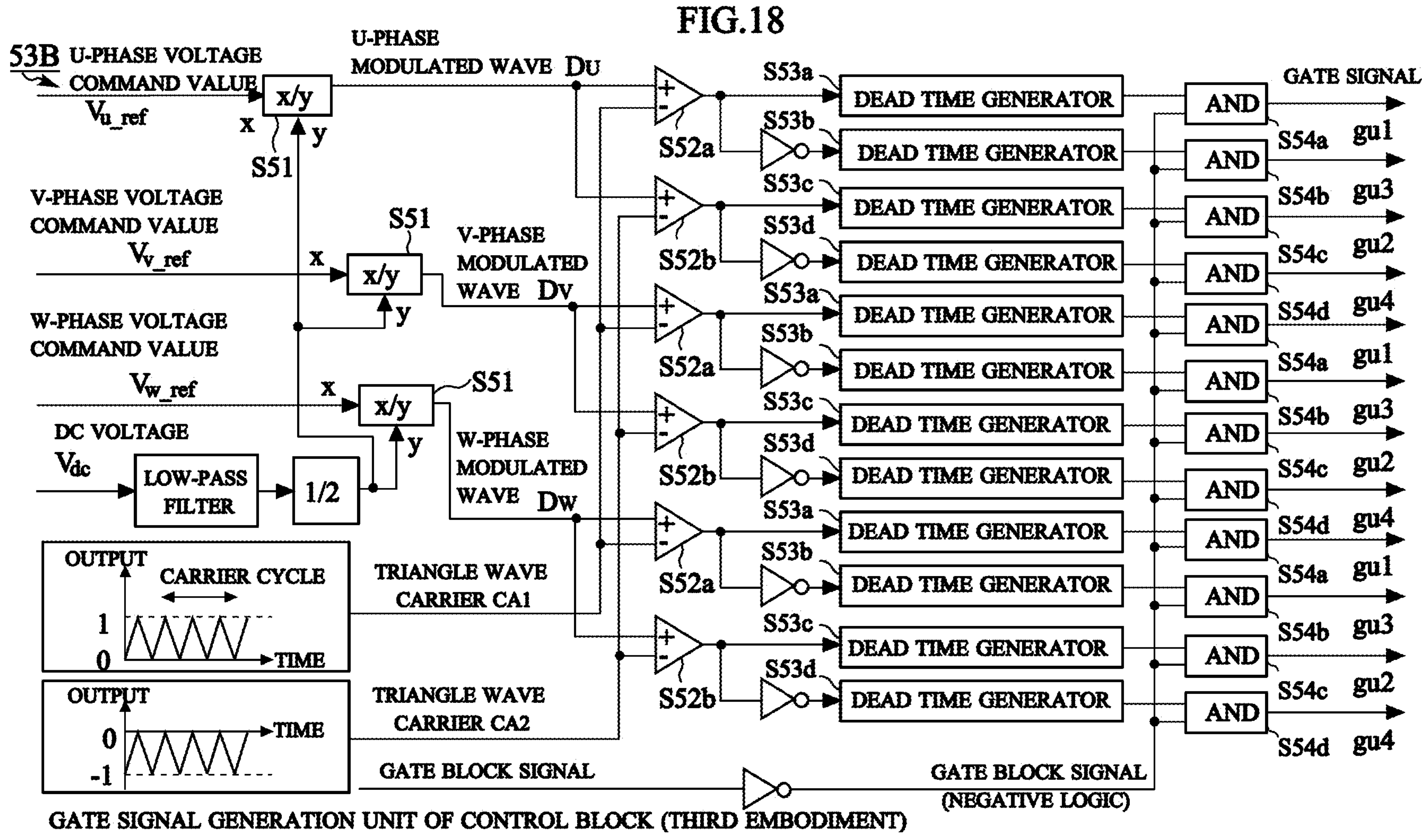
FIG.18
53B
U-PHASE VOLTAGE COMMAND VALUE
Vu_ref
V-PHASE VOLTAGE COMMAND VALUE
Vv_ref
W-PHASE VOLTAGE COMMAND VALUE
Vw_ref
DC VOLTAGE
Vdc
LOW-PASS FILTER
1/2
x/y
x
y
S51
U-PHASE MODULATED WAVE DU
V-PHASE MODULATED WAVE DV
W-PHASE MODULATED WAVE DW
OUTPUT
CARRIER CYCLE
1
0
TIME
TRIANGLE WAVE CARRIER CA1
OUTPUT
0
-1
TIME
TRIANGLE WAVE CARRIER CA2
GATE BLOCK SIGNAL
S52a
S52b
S53a
S53b
S53c
S53d
DEAD TIME GENERATOR
AND
S54a
S54b
S54c
S54d
gu1
gu3
gu2
gu4
GATE SIGNAL
GATE BLOCK SIGNAL (NEGATIVE LOGIC)
GATE SIGNAL GENERATION UNIT OF CONTROL BLOCK (THIRD EMBODIMENT)

VOLTAGE COMMAND GENERATION UNIT OF CONTROL BLOCK (FOURTH EMBODIMENT)

CONFIGURATION EXAMPLE 1 OF MULTILEVEL POWER CONVERTER (CORRESPONDING TO THREE PHASES)

CONFIGURATION EXAMPLE 2 OF MULTILEVEL POWER CONVERTER (CORRESPONDING TO THREE PHASES)

CONFIGURATION EXAMPLE 3 OF MULTILEVEL POWER CONVERTER (CORRESPONDING TO ONE PHASE)

MULTILEVEL POWER CONVERSION SYSTEM, AND CIRCUITRY OF MULTILEVEL POWER CONVERSION SYSTEM

TECHNICAL FIELD

The present invention relates to a multilevel power conversion system, and circuitry of the multilevel power conversion system.

BACKGROUND ART

In related art, for example, a multilevel power converter including a plurality of DC capacitors which are two or more DC capacitors connected in series on a DC side, and two semiconductor switching elements connected at a serial connection point of the plurality of DC capacitors in inverse series is known (for example, see PTL 1 and PTL 2). Note that hereinafter, in the present specification, and the like, a serial connection point of the plurality of DC capacitors will be also referred to as a "DC neutral point", and the two semiconductor switching elements connected at the serial connection point (DC neutral point) of the plurality of DC capacitors in inverse series will be also referred to as "neutral point elements".

CITATION LIST

Patent Literature

[PTL 1] JP 2013116020 A
[PTL 2] JP 2019024290 A

SUMMARY OF THE INVENTION

Problems to be Solved by the Invention

FIG. 22 is a view illustrating one example of a configuration of a multilevel power converter 130 according to one aspect. FIG. 22 illustrates a configuration of the multilevel power converter 130 corresponding to three phases, employing a three-level neutral point potential (NPP) scheme, as a configuration example 1 of the multilevel power converter. As illustrated in FIG. 22, in the multilevel power converter 130, two DC capacitors $C_P$ and $C_N$ are connected in series via a DC neutral point C, and two semiconductor switching elements (neutral point elements) 102 and 103 of each of three phases are connected to the DC neutral point C in inverse series. Note that in the example illustrated in FIG. 22, the semiconductor switching elements (neutral point elements) 102 and 103 are connected in inverse series while having a common collector side of an insulated gate bipolar transistor (IGBT).

FIG. 23 is a view illustrating one example of a configuration of a multilevel power converter 230 according to another aspect. FIG. 23 illustrates a configuration of the multilevel power converter 230 corresponding to three phases, employing a three-level NPP scheme, as a configuration example 2 of the multilevel power converter. As illustrated in FIG. 23, in the multilevel power converter 230, two DC capacitors $C_P$ and $C_N$ are connected in series via the DC neutral point C, and two semiconductor switching elements (neutral point elements) 202 and 203 of each of three phases are connected to the DC neutral point C in inverse series. Note that in the example illustrated in FIG. 23, the semiconductor switching elements (neutral point elements) 202 and 203 are connected in inverse series while having a common emitter side of the IGBT. Note that the multilevel power converter 130 illustrated in FIG. 22 has the same configuration as the configuration of the multilevel power converter 230 illustrated in FIG. 23 except that a direction of the semiconductor switching elements 102 and 103 that are connected in inverse series is opposite to a direction of the semiconductor switching elements 202 and 203 that are connected in inverse series.

FIG. 24 is a view illustrating one example of a configuration of a multilevel power converter 330 according to another aspect. FIG. 24 illustrates a configuration of the multilevel power converter 330 corresponding to one phase, employing a five-level NPP scheme, as a configuration example 3 of the multilevel power converter. As illustrated in FIG. 24, in the multilevel power converter 330, four DC capacitors $C_P$ and $C_N$ are connected in series via three DC neutral points C, and two semiconductor switching elements (neutral point elements) 302 and 303 are connected to each of the DC neutral points C in inverse series. Note that in the example illustrated in FIG. 24, the semiconductor switching elements (neutral point elements) 302 and 303 are connected in inverse series while having a common collector side of the IGBT. However, while not illustrated, the semiconductor switching elements (neutral point elements) may be connected in inverse series while having a common emitter side.

Here, for example, in the multilevel power conversion system including the multilevel power converters 130, 230, 330, and the like, illustrated from FIG. 22 to FIG. 24, there is a case where the semiconductor elements break down due to an overvoltage by a surge voltage (lightning surge) by a lightning stroke. In other words, in the multilevel power conversion system, potentials at a positive electrode and a negative electrode (a P electrode and an N electrode) on the DC side of the power converter may largely fluctuate due to a surge voltage by a lightning stroke, part of the surge voltage may be charged to parasitic capacitances of the semiconductor elements, and the semiconductor elements may break down due to an overvoltage.

It is therefore an object of the present disclosure to provide means for preventing semiconductor elements of a power converter from breaking down due to an overvoltage by a lightning surge in a multilevel power conversion system.

Means for Solving the Problems

A multilevel power conversion system according to one aspect includes a multilevel power converter that includes a DC input/output unit including a positive terminal and a negative terminal connected to a DC power supply or a DC load, a plurality of DC capacitors connected in series via a DC neutral point between the positive terminal and the negative terminal, an AC input/output unit including an AC terminal connected to an AC power supply or an AC load, a first semiconductor switching element and a fourth semiconductor switching element connected in series via the AC terminal between the positive terminal and the negative terminal to have the same polarity, a first freewheeling diode and a fourth freewheeling diode respectively connected in inverse parallel to the first semiconductor switching element and the fourth semiconductor switching element, a third semiconductor switching element and a second semiconductor switching element connected in series between the DC neutral point and the AC terminal to have reverse polarity, and a third freewheeling diode and a second freewheeling diode respectively connected in inverse parallel to the third semiconductor switching element and the second semiconductor switching element, and a controller that includes an operation control unit that causes an operation mode of the multilevel power converter to transition to a standby mode in which power conversion is not performed between the DC input/output unit and the AC input/output unit based on a predetermined condition, and a gate signal generation unit that generates and outputs a gate signal that puts at least one of the third semiconductor switching element or the second semiconductor switching element into a conducting state or a switching state in the standby mode.

A controller of a multilevel power conversion system according to one aspect is a controller of a multilevel power conversion system including a multilevel power converter that includes a DC input/output unit including a positive terminal and a negative terminal connected to a DC power supply or a DC load, a plurality of DC capacitors connected in series via a DC neutral point between the positive terminal and the negative terminal, an AC input/output unit including an AC terminal connected to an AC power supply or an AC load, a first semiconductor switching element and a fourth semiconductor switching element connected in series via the AC terminal between the positive terminal and the negative terminal to have the same polarity, a first freewheeling diode and a fourth freewheeling diode respectively connected in inverse parallel to the first semiconductor switching element and the fourth semiconductor switching element, a third semiconductor switching element and a second semiconductor switching element connected in series between the DC neutral point and the AC terminal to have reverse polarity, and a third freewheeling diode and a second freewheeling diode respectively connected in inverse parallel to the third semiconductor switching element and the second semiconductor switching element, in which the controller includes an operation control unit that causes an operation mode of the multilevel power converter to transition to a standby mode in which power conversion is not performed between the DC input/output unit and the AC input/output unit based on a predetermined condition, and a gate signal generation unit that generates and outputs a gate signal that puts at least one of the third semiconductor switching element or the second semiconductor switching element into a conducting state or a switching state in the standby mode.

Advantageous Effects of the Invention

According to the present disclosure, it is possible to prevent semiconductor elements of a power converter from breaking down due to an overvoltage by a lightning surge in a multilevel power conversion system.

BRIEF DESCRIPTION OF THE DRAWINGS

FIG. 1 is a view illustrating one example of a configuration of a multilevel power conversion system according to a first embodiment.

FIG. 5 is a view illustrating one example of a charging path to parasitic capacitances of respective units by a lightning stroke in the circuit configuration of the multilevel power converter illustrated in FIG. 3 and FIG. 4.

FIG. 7 is a view indicating organized cases that are categorized depending on whether or not neutral point elements break down due to an overvoltage by a lightning surge in the circuit configuration of the multilevel power converter illustrated in FIG. 3 and FIG. 4.

FIG. 11 is a view illustrating an equivalent circuit of the charging path illustrated in FIG. 10.

FIG. 12 is a flowchart indicating a sequence of state transition between a power generation mode and a standby mode of the multilevel power conversion system illustrated in FIG. 1.

FIG. 14 is a view illustrating one example of a control configuration of a gate signal generation unit of the control unit illustrated in FIG. 2.

FIG. 16 is a view illustrating one example of a control configuration of a gate signal generation unit of a control unit according to a second embodiment.

FIG. 18 is a view illustrating one example of a control configuration of a gate signal generation unit of the control unit according to the third embodiment.

DESCRIPTION OF EMBODIMENTS

Figure 2:
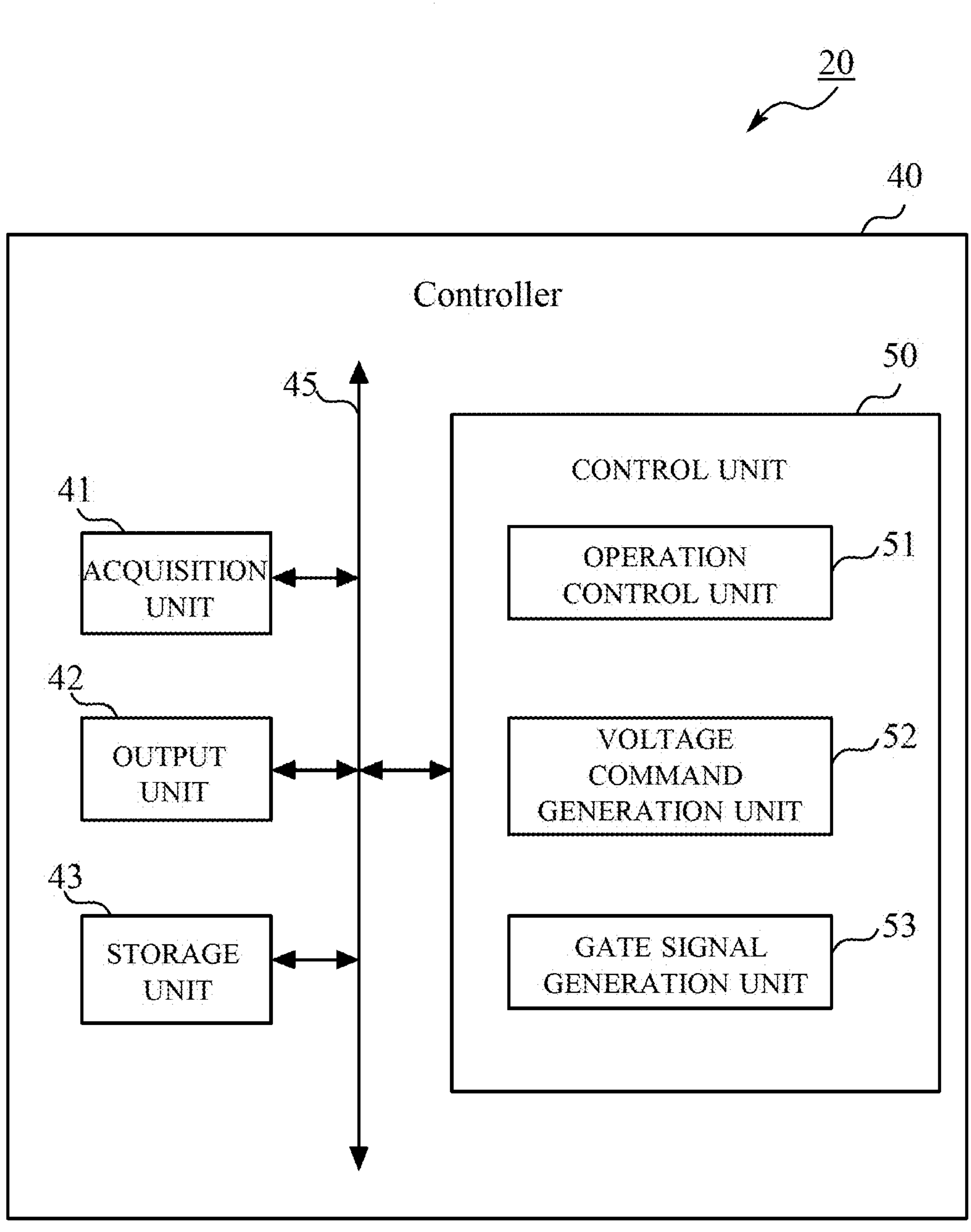
FIG. 2 is a view illustrating one example of a configuration of a controller in the multilevel power conversion system illustrated in FIG. 1.

Embodiments of a multilevel power conversion system and a controller of the multilevel power conversion system according to the present disclosure will be described below using the drawings.

Configuration Example of First Embodiment

FIG. 1 is a view illustrating one example of a multilevel power conversion system 20 according to a first embodiment.

As illustrated in FIG. 1, the multilevel power conversion system 20 is connected to photovoltaics 11 via a DC cable 12 on a DC side that is a left side in FIG. 1. Further, the multilevel power conversion system 20 is connected to an AC electric power system 15 via an AC cable 13 and a transformer 14 on an AC side that is a right side in FIG. 1. The multilevel power conversion system 20, for example, converts DC power acquired from the photovoltaics 11 into AC power and outputs the converted AC power to the AC electric power system 15 via the transformer 14. Hereinafter, in the present specification, and the like, the multilevel power conversion system 20 will be also referred to as a "power conversion system 20".

The photovoltaics (PV) 11, which will be also referred to as solar panels, are connected to an input end (a DC input/output unit 31 (see FIGS. 3 and 4)) that is one end side of the power conversion system 20 via the DC cable 12. The photovoltaics 11 generate power using sunlight, and the generated DC power is supplied to the power conversion system 20 via the DC cable 12. Note that the photovoltaics 11 are one example of a "DC power supply or a DC load" and may be, for example, a DC power supply such as an "energy storage system (ESS)", other DC loads, or the like.

The DC cable 12 has one end connected to the photovoltaics 11 and the other end connected to a DC end (DC input/output unit 31 (see FIGS. 3 and 4)) of a multilevel power converter 30 which will be described later, of the power conversion system 20. The DC cable 12 includes a positive side cable and a negative side cable and supplies DC power supplied from the photovoltaics 11 to the multilevel power converter 30 which will be described later.

The AC cable 13 has one end connected to an AC end (AC input/output unit 32 (see FIGS. 3 and 4)) of the multilevel power converter 30 which will be described later, of the power conversion system 20 and the other end connected to the AC electric power system 15 via the transformer 14. The AC cable 13 is, for example, a three-phase AC circuit employing a three-phase three-wire system that supplies three-phase AC power which is a combination of single-phase alternating currents of three systems obtained by shifting phases of currents or voltages from each other, using three wires, cables and conductors. The AC cable 13 supplies AC power converted by the multilevel power converter 30 which will be described later to the AC electric power system 15 side.

The transformer 14 has one end connected to an output side that is the other end side of the power conversion system 20 via the AC cable 13 and the other end connected to the AC electric power system 15. The transformer 14 transforms a voltage of AC power output from the power conversion system 20 into a predetermined voltage and outputs the power to the AC electric power system 15.

The AC electric power system (electric power system) 15 is a system which is connected to the transformer 14 and supplies the AC power whose voltage is transformed by the transformer 14 to power receiving equipment of a consumer and in which power generation, transformation, transmission and distribution are integrated, and, for example, an unspecified load is connected. Hereinafter, in the present specification, and the like, the AC electric power system 15 will be also simply referred to as an "electric power system 15". Note that the AC electric power system (electric power system) 15 is one example of an "AC power supply or an AC load" and may be, for example, an electric power system or, for example, an electric motor, a generator, other AC loads, or the like.

The multilevel power conversion system (power conversion system) 20 is, for example, a photovoltaics-power conditioning system (PV-PCS) for photovoltaic generation (photovoltaics). The power conversion system 20 converts DC power supplied from the photovoltaics 11 into AC power and outputs the converted AC power to the electric power system 15 side via the transformer 14. Note that the power conversion system 20 is not limited to a system for photovoltaic generation and may be, for example, an energy storage system-power conditioning system (ESS-PCS), or the like. In other words, the present disclosure can be applied to a power conversion system in which a potential on a DC side fluctuates by a lightning stroke, or the like, while operation is stopped.

The multilevel power conversion system (power conversion system) 20 includes a DC switch 21, an AC reactor 22, an AC capacitor 23, an AC switch 24, a DC voltage sensor 25, an AC current sensor 26, the multilevel power converter 30, and a controller 40. The DC switch 21 and the DC voltage sensor 25 are positioned between the photovoltaics 11 and the multilevel power converter 30 on the DC cable 12. Further, the AC reactor 22, the AC capacitor 23, the AC switch 24, and the AC current sensor 26 are positioned between the multilevel power converter 30 and the transformer 14 on the AC cable 13. Note that hereinafter, in the present specification, and the like, the multilevel power converter 30 will be also referred to as a "power converter 30".

The DC switch (DC breaker) 21 is provided in series between the photovoltaics 11 and the power converter 30 on the DC cable 12. The DC switch 21, for example, switches ON (connects) or OFF (breaks) the DC cable 12 between the photovoltaics 11 and the power converter 30 in accordance with a switching ON instruction or a switching OFF instruction from the controller 40, a host apparatus (not illustrated), or an operator. The DC switch 21 is, for example, an electrical contactor, or the like, that can be disconnected and connected in accordance with an instruction from the controller 40. Note that the DC switch 21 may be, for example, a DC breaker (breaker), or the like, for which disconnecting and connecting operation is normally manually performed and which automatically breaks the DC cable 12 if an overcurrent such as a short-circuit current is detected. If the DC switch 21 is disconnected, inflow of DC power supplied from the photovoltaics 11 into the power converter 30 is broken.

The AC reactor 22 is connected in series to the AC cable 13 of each phase on an output end (AC input/output unit 32 (see FIGS. 3 and 4)) of the power converter 30. The AC reactor 22 is, for example, a smoothing element having an effect of reducing noise or an effect of reducing a surge voltage. The AC reactor 22, for example, constitutes an LC filter circuit (filter circuit) that reduces ripple (oscillation) occurring when a switching element which will be described later, of the power converter 30 performs switching, along with the AC capacitor 23 connected in an L shape.

The AC capacitor 23 is connected in an L shape to the AC cable 13 of each phase at the output end of the power converter 30 via a branch point. The AC capacitor 23 is an electronic component that stores or discharges electricity (electric charge). The AC capacitor 23, for example, constitutes an LC filter circuit (filter circuit) that reduces ripple (oscillation) occurring when the switching element which will be described later, of the power converter 30 performs switching, along with the AC reactor 22 connected in an L shape. The AC capacitor 23 prevents a harmonic (harmonic current) from flowing out to the electric power system 15 side by constituting the filter circuit along with the AC reactor 22.

The AC switch (AC breaker) 24 is provided in series between the AC reactor 22 (filter circuit) and the transformer 14 on the AC cable 13 of each phase. The AC switch 24, for example, switches ON (connects) or OFF (breaks) the AC cable 13 between the power converter 30 and the electric power system 15 in accordance with an AC switch operation signal from the controller 40 or a switching ON instruction or a switching OFF instruction from a host apparatus (not illustrated) or an operator. If the AC switch 24 is disconnected, outflow of AC power supplied from the power converter 30 to the electric power system 15 side is broken.

The DC voltage sensor 25, which is, for example, a publicly known DC voltmeter, a DC voltage sensor, or the like, is provided between the photovoltaics 11 and the power converter 30 and detects a DC voltage value $V_{dc}$. Note that a position at which the DC voltage sensor 25 is provided is not limited to the position illustrated in FIG. 1 and may be any position if the DC voltage value $V_{dc}$ can be detected. Hereinafter, in the present specification, and the like, the DC voltage value $V_{dc}$ will be also referred to as a "DC voltage $V_{dc}$", or simply a "voltage $V_{dc}$". The DC voltage $V_{dc}$ detected by the DC voltage sensor 25 is acquired by the controller 40.

The AC current sensor 26, which is, for example, a publicly known AC ammeter, an AC current sensor, or the like, is provided between the power converter 30 and the transformer 14 and detects AC current values $I_u$, $I_v$ and $I_w$ of three phases. Note that a position at which the AC current sensor 26 is provided is not limited to the position illustrated in FIG. 1 and may be any position if the AC current values $I_u$, $I_v$ and $I_w$ of three phases can be detected. Hereinafter, in the present specification, and the like, the AC current values $I_u$, $I_v$ and $I_w$ will be also referred to as "AC currents $I_u$, $I_v$ and $I_w$", "current measurement values $I_u$, $I_v$ and $I_w$" or simply "currents $I_u$, $I_v$ and $I_w$". The AC currents $I_u$, $I_v$ and $I_w$ detected by the AC current sensor 26 are acquired by the controller 40.

The multilevel power converter (power converter) 30 has one end side that is a DC end (DC input/output unit 31 (see FIGS. 3 and 4)) connected to the DC switch 21 via the DC cable 12 and the other end side that is an AC end (AC input/output unit 32 (see FIGS. 3 and 4)) connected to the AC reactor 22 (filter circuit) via the AC cable 13. The power converter 30 is, for example, constituted of a plurality of switching elements which will be described later, such as an IGBT. The power converter 30 is, for example, controlled by a pulse width modulation (PWM) signal that is a gate drive signal (gate signal) of the switching element generated at the controller 40. In other words, the power converter 30 is controlled by the gate signal for causing the power converter 30 to operate.

The power converter 30 acquires DC power supplied from the photovoltaics 11 from one end side, converts the acquired DC power into AC power in accordance with control by the pulse width modulation signal (gate signal) and outputs the AC power from the other end that is an output end to supply to the AC cable 13. In other words, the power converter 30 is caused to operate in accordance with control by the gate signal. Note that details of the power converter 30 will be described later (see FIGS. 3 to 11, and the like).

The controller 40 is, for example, provided inside or outside the power conversion system 20 and is electrically connected to respective components of the power conversion system 20 including the power converter 30 in a wired or wireless manner while part of wirings, and the like, is omitted in the drawings. Note that the controller 40 may be implemented as a function of an inverter control circuit (not illustrated). Further, the controller 40 may operate in accordance with an instruction from a host apparatus (not illustrated) or an instruction from an operator (not illustrated), or the like, via an operation unit (not illustrated). Note that the host apparatus (not illustrated), for example, comprehensively monitors and controls a plurality of power conversion systems 20 and may be connected to each of the power conversion systems 20 in a wired or wireless manner.

FIG. 2 is a view illustrating one example of a configuration of the controller 40 in the multilevel power conversion system 20 illustrated in FIG. 1.

The controller 40 acquires the DC voltage $V_{dc}$ detected by the DC voltage sensor 25 and outputs an AC switch operation signal in accordance with a control method which will be described later (see FIG. 1, and the like). Further, the controller 40 acquires the DC voltage $V_{dc}$ detected by the DC voltage sensor 25 and the AC currents $I_u$, $I_v$ and $I_w$ detected by the AC current sensor 26 and outputs a gate signal in accordance with the control method which will be described later (see FIG. 1, and the like). The controller 40 includes an acquisition unit 41, an output unit 42, a storage unit 43, a system bus 45, and a control unit 50. The acquisition unit 41, the output unit 42, the storage unit 43, and the control unit 50 are connected to each other via the system bus 45.

The acquisition unit 41 is connected to the DC voltage sensor 25, the AC current sensor 26 and the system bus 45. The acquisition unit 41 may be connected to a host apparatus (not illustrated), and the like. The acquisition unit 41, for example, acquires the DC voltage $V_{dc}$ detected by the DC voltage sensor 25 and the AC currents $I_u$, $I_v$ and $I_w$ detected by the AC current sensor 26. The acquisition unit 41, for example, outputs the acquired each voltage value and each current value to each component of the controller 40 via the system bus 45.

The output unit 42 is connected to the AC switch 24, the power converter 30, and the system bus 45. The output unit 42 may be connected to a host apparatus (not illustrated), and the like. The output unit 42, for example, outputs the AC switch operation signal to the AC switch 24 or outputs the gate signal to the power converter 30 in accordance with the instruction acquired from the control unit 50 via the system bus 45.

The storage unit 43, which is, for example, a volatile or a non-volatile storage medium such as a hard disk drive (HDD), a solid state drive (SSD), and other semiconductor memories, is connected to the system bus 45. The storage unit 43, for example, stores programs necessary for operation of the respective units of the controller 40, and various kinds of information are written in or read out from the storage unit 43 by the respective units of the controller 40. Further, the storage unit 43 stores, for example, values detected by respective sensors such as the DC voltage sensor 25 and the AC current sensor 26, various kinds of arithmetic expressions and coefficients to be used in calculation by the control unit 50, predetermined thresholds, predetermined determination values, and the like.

The storage unit 43 is connected to the respective units of the controller 40 by the system bus 45, or the like, so that various kinds of information can be input/output. Note that the storage unit 43 may be provided outside the controller 40 and may be connected to the controller 40 in a wired or wireless manner. Further, the storage unit 43 may be an external storage medium, or the like, such as a memory card and a digital versatile disc (DVD), or may be an online storage, or the like. Further, the storage unit 43 may be also used as a memory 92 (see FIG. 21) which will be described later.

The system bus (bus) 45, which is a data transmission path (bus) connecting respective components inside the controller 40, connects the acquisition unit 41, the output unit 42, the storage unit 43 and the control unit 50 so that various kinds of information can be input/output.

The control unit 50 includes, for example, a processor 91 (see FIG. 21) which will be described later such as a central processing unit (CPU) that operates by executing a program. The control unit 50, for example, comprehensively controls operation of the power conversion system 20 by causing the processor 91 to operate by executing a predetermined program stored in the storage unit 43 or a memory 92 (see FIG. 21) which will be described later. Note that the control unit 50 may control the operation of the power conversion system 20 in accordance with an instruction accepted from a host apparatus (not illustrated) or an instruction accepted from an operator (not illustrated) via an operation unit (not illustrated).

The control unit 50, for example, functions as the following respective units by executing a predetermined program stored in the storage unit 43 or the memory 92 (see FIG. 21) which will be described later. The control unit 50, for example, functions as an operation control unit 51, a voltage command generation unit 52, and a gate signal generation unit 53. Note that the above-described respective functions may be implemented by a program to be executed by the processor 91 (see FIG. 21) which will be described later in a processing circuit 90 (see FIG. 21) which will be described later, of the controller 40 or may be implemented by hardware 93 (see FIG. 21) which will be described later. Note that the operation control unit 51, the voltage command generation unit 52, and the gate signal generation unit 53 perform the following processing by executing a predetermined program.

The operation control unit 51, for example, outputs the AC switch operation signal to the AC switch 24 based on, for example, the DC voltage $V_{dc}$ detected by the DC voltage sensor 25 based on a predetermined condition (see FIG. 1, and the like). Further, the operation control unit 51, for example, causes operation of the power converter 30 to transition based on a disconnected/connected state of the AC switch 24 based on the predetermined condition. For example, the operation control unit 51 causes an operation mode of the power converter 30 to transition to a standby mode in which power conversion is not performed between a DC input/output unit and an AC input/output unit which will be described later or transition to a power generation mode in which power conversion is performed based on the predetermined condition. Further, the operation control unit 51, for example, outputs a standby mode signal and a gate block signal that are 0 (low level) or 1 (high level) to the gate signal generation unit 53 based on the disconnected/connected state of the AC switch 24 or the operation mode of the power converter 30 based on the predetermined condition.

The voltage command generation unit 52, for example, generates voltage command values $V_{u\_ref}$, $V_{v\_ref}$ and $V_{w\_ref}$ of three phases based on a predetermined output voltage command value $P_{\_ref}$ and the AC currents $I_u$, $I_v$ and $I_w$ of three phases detected by the AC current sensor 26. Then, the voltage command generation unit 52 outputs the generated voltage command values $V_{u\_ref}$, $V_{v\_ref}$ and $V_{w\_ref}$ of three phases to the gate signal generation unit 53.

The gate signal generation unit 53 acquires the voltage command values $V_{u\_ref}$, $V_{v\_ref}$ and $V_{w\_ref}$ output from the voltage command generation unit 52 and the DC voltage $V_{dc}$ detected by the DC voltage sensor 25. Further, the gate signal generation unit 53 acquires triangle wave carriers CA1 and CA2 having a predetermined carrier cycle and the standby mode signal and the gate block signal output from the operation control unit 51. The gate signal generation unit 53, for example, generates the gate signal based on the voltage command values $V_{u\_ref}$, $V_{v\_ref}$ and $V_{w\_ref}$, the DC voltage $V_{dc}$, the triangle wave carriers CA1 and CA2, the standby mode signal, and the gate block signal. The gate signal generation unit 53 outputs the generated gate signal to the power converter 30 and puts at least one of the semiconductor switching element 2 or 3 (see FIG. 3, and the like) into a conducting state or a switching state in a case where the AC switch 24 is disconnected or the power converter 30 is in the standby mode. Further, the gate signal generation unit 53 outputs the generated gate signal to the power converter 30 and causes both of the semiconductor switching elements 1 and 4 (see FIG. 3, and the like) into a non-conducting state in a case where the AC switch 24 is disconnected or the power converter 30 is in the standby mode.

Note that details of a control configuration or processing (operation) of the operation control unit 51, the voltage command generation unit 52, and the gate signal generation unit 53 described above in the control unit 50 (control block) will be described later (see FIG. 12 to FIG. 20, and the like).

Figure 3:
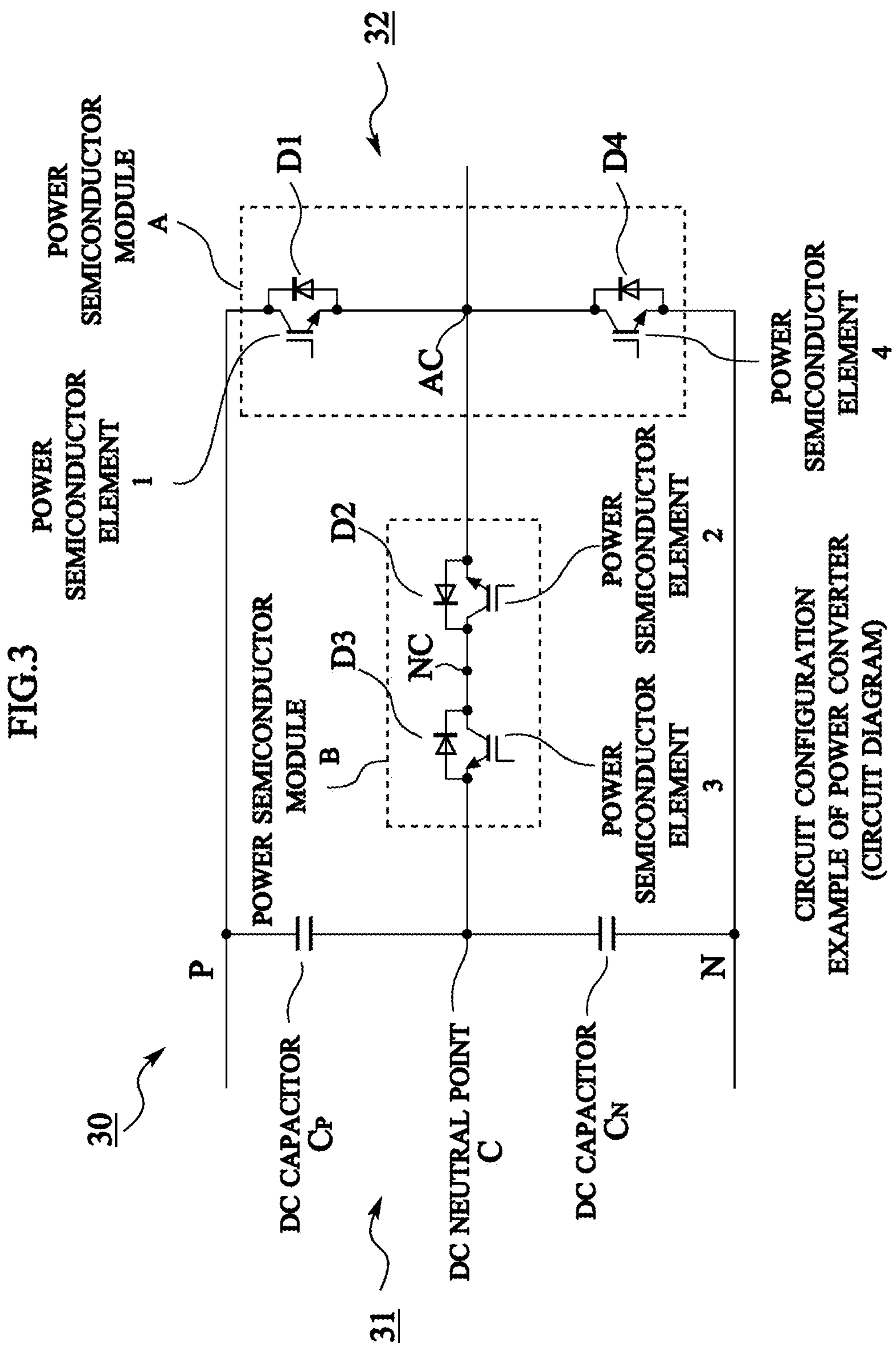
FIG. 3 is a circuit diagram illustrating one example of a circuit configuration of a multilevel power converter illustrated in FIG. 1.
Figure 22:
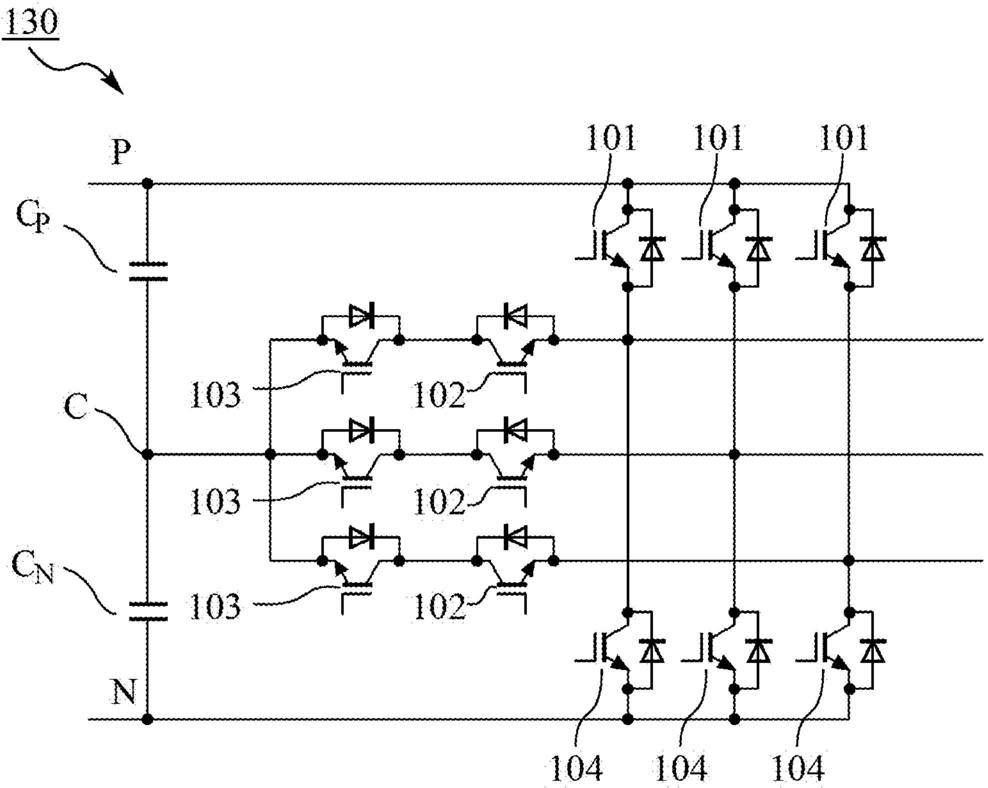
FIG. 22 is a view illustrating one example of a configuration of a multilevel power converter according to one aspect.

FIG. 3 is a circuit diagram illustrating one example of a circuit configuration of the multilevel power converter 30 illustrated in FIG. 1. FIG. 3 illustrates a configuration (circuit diagram) corresponding to one phase (for example, a U phase) among three phases as one example of the circuit configuration of the power converter 30 to simplify the description. Note that actually, the power converter 30 has a circuit configuration corresponding to three phases (see, for example, FIGS. 22 and 23, and the like) in which, for example, three circuits illustrated in FIG. 3 are arranged and circuits on the DC side are connected in parallel. However, in the present disclosure, the number of phases in the circuit configuration of the power converter 30 is not limited to three and may be a single phase or a plurality of phases other than three phases.

As illustrated in FIG. 3, the power converter 30 includes the DC input/output unit 31 and the AC input/output unit 32. Further, the power converter 30 includes a positive terminal P, a negative terminal N, a DC capacitor $C_P$, a DC capacitor $C_N$, a DC neutral point C, a power semiconductor module A, and a power semiconductor module B. The power semiconductor module A includes a power semiconductor element 1, a power semiconductor element 4, and an AC terminal AC, and the power semiconductor module B includes a power semiconductor element 3, a power semiconductor element 2, and a no connection terminal NC. Note that in the present specification, and the like, the AC terminal AC will be also referred to as an "alternating current (AC) terminal", and the no connection terminal NC will be also referred to as a "no connection (NC) terminal".

The DC input/output unit 31 is a DC end of the power converter 30 and includes a positive terminal P and a negative terminal N connected to the photovoltaics 11 (a DC power supply or a DC load).

The AC input/output unit 32 is an AC end of the power converter 30 and includes the AC terminal AC connected to the electric power system 15 (an AC power supply or an AC load).

The positive terminal P and the negative terminal N are respectively connected to a positive electrode (P electrode) side and a negative electrode (N electrode) side of the photovoltaics (DC power supply) 11 via the DC cable 12.

The DC capacitor $C_P$ and the DC capacitor $C_N$ are connected in series between the positive terminal P and the negative terminal N via the DC neutral point C. The DC capacitor $C_P$ and the DC capacitor $C_N$, which are, for example, DC smoothing capacitors that smooth voltage fluctuation (ripple), are connected in series via the DC neutral point C.

Further, the power semiconductor module A is connected in series between the positive terminal P and the negative terminal N. In the power semiconductor module A, the power semiconductor element 1 and the power semiconductor element 4 are connected in series to have the same polarity via the AC terminal AC (AC terminal). Further, the power semiconductor module B is connected in series between the DC neutral point C and the AC terminal AC. In the power semiconductor module B, the power semiconductor element 3 and the power semiconductor element 2 are connected in series to have reverse polarity via the no connection terminal NC (NC terminal).

The power semiconductor elements (semiconductor switching elements) 1 to 4 respectively have freewheeling diodes D1 to D4, and the power semiconductor elements 1 to 4 (semiconductor switching elements) and the freewheeling diodes D1 to D4 are respectively connected in inverse parallel. The power semiconductor elements 1 to 4 are, for example, semiconductor switching elements constituted of IGBTs, or the like, and operation of ON/OFF is controlled by the gate signal output from the controller 40.

Note that hereinafter, in the present specification, and the like, the power semiconductor elements 1 and 4 in the power semiconductor module A will be also respectively referred to as "semiconductor switching elements 1 and 4", "semiconductor elements 1 and 4" or simply "elements 1 and 4". Further, the power semiconductor elements 2 and 3 in the power semiconductor module B will be also respectively referred to as "neutral point elements 2 and 3", "semiconductor switching elements 2 and 3", "semiconductor elements 2 and 3", or simply "elements 2 and 3". Note that the power semiconductor elements (semiconductor switching elements) 1 to 4 are respectively one example of a "first semiconductor switching element" to a "fourth semiconductor switching element".

The freewheeling diodes D1 to D4 are freewheeling diodes which are respectively connected to the semiconductor elements 1 to 4 in inverse parallel and which, for example, reflux energy when the IGBT is put into an OFF state. Note that hereinafter, in the present specification, and the like, the freewheeling diodes D1 to D4 will be also respectively referred to as "inverse parallel diodes D1 to D4" or simply "diodes D1 to D4". Note that the freewheeling diodes D1 to D4 are respectively one example of a "first freewheeling diode" to a "fourth freewheeling diode".

Figure 4:
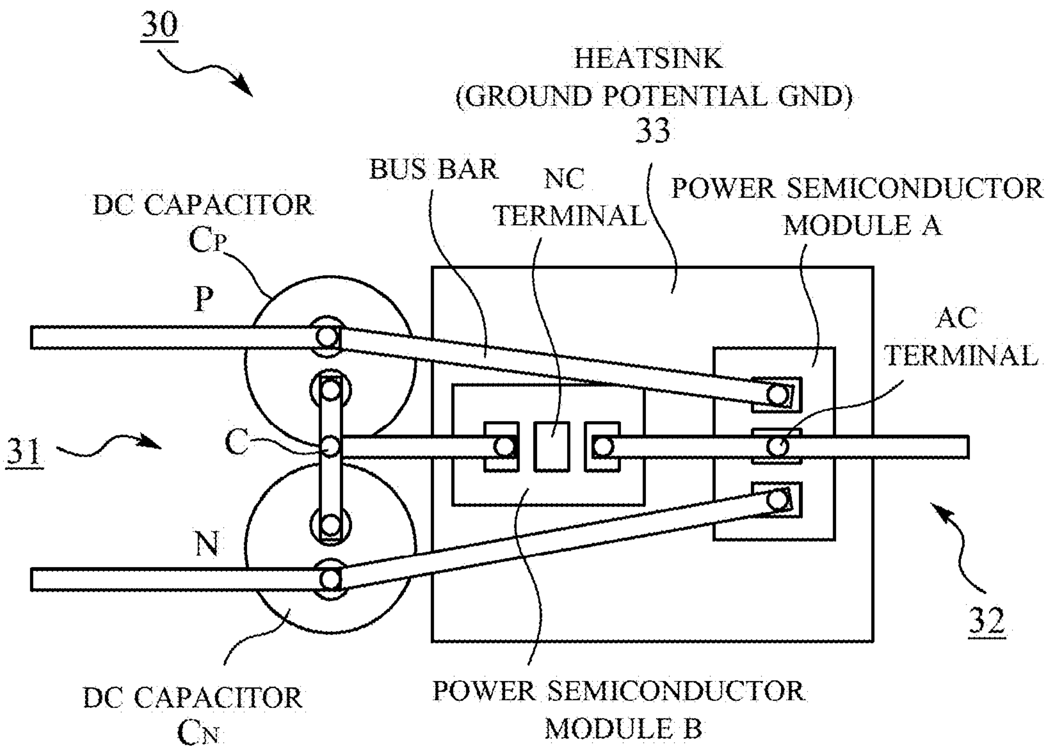
FIG. 4 is a real wiring diagram illustrating one example of a circuit configuration of the multilevel power converter illustrated in FIG. 1.

FIG. 4 is a real wiring diagram illustrating one example of a circuit configuration of the multilevel power converter 30 illustrated in FIG. 1. FIG. 4 illustrates the same circuit as the circuit in the circuit diagram illustrated in FIG. 3 as the real wiring diagram.

In the real wiring diagram illustrated in FIG. 4, for example, a bus bar is used as each wiring such as the DC cable 12 and the AC cable 13. Further, in FIG. 4, the power semiconductor module A and the power semiconductor module B are positioned on a heatsink 33. There is a case where cases (heatsink attachment surfaces) of the semiconductor elements 1 to 4 in the power semiconductor modules A and B are in electrical contact with the heatsink 33, the heatsink 33 is grounded, and the cases of the semiconductor elements 1 to 4 have potentials to ground (ground potentials GND). In other words, the heatsink 33 is normally grounded, and thus, the heatsink 33 may be conductive with a sheet like a copper sheet of the cases (heatsink attachment surfaces) of the semiconductor elements 1 to 4, and the cases of the semiconductor elements 1 to 4 may have potentials to ground (ground potentials GND). Note that other components are similar to those in FIG. 2, and thus, description will be omitted.

Operating Principle of First Embodiment

FIG. 5 is a view illustrating one example of a charging path to parasitic capacitances of respective units by a lightning stroke in the circuit configuration of the multilevel power converter 30 illustrated in FIG. 3 and FIG. 4.

Principle of parasitic capacitances $C_1$ to $C_4$ of the semiconductor elements 1 to 4 being charged by a surge voltage by a lightning stroke will be described below. FIG. 5 illustrates a case where the potentials to ground of the P electrode and the N electrode are charged with negative polarity by a lightning stroke. Note that in the present specification, and the like, the surge voltage by the lightning stroke will be also referred to as a "lightning surge voltage" or simply a "surge voltage".

As described above, there is a case where the cases of the semiconductor elements 1 to 4 are in electrical contact with the heatsink 33, the heatsink 33 is grounded and the cases of the semiconductor elements 1 to 4 have potentials to ground (ground potentials GND). In this event, as illustrated in FIG. 5, a parasitic capacitance CAC exists between the semiconductor elements 1 and 4 inside the power semiconductor module A and the cases (heatsink attachment surfaces) of the semiconductor elements 1 and 4. Further, in a similar manner, a parasitic capacitance CNC exists between the semiconductor elements 3 and 2 inside the power semiconductor module B and the cases (heatsink attachment surfaces) of the semiconductor elements 3 and 2.

In other words, an insulating substrate (not illustrated) is positioned between copper sheets attached to the cases (heatsink attachment surfaces) of the semiconductor elements 1 to 4, and the semiconductor elements 1 to 4. By this means, as a result of the insulating substrate (not illustrated) playing a role like a capacitor, the parasitic capacitances CAC and CNC exist between the copper sheets (potentials to ground) attached to the cases (heatsink attachment surfaces) of the semiconductor elements 1 to 4, and the semiconductor elements 1 to 4.

Further, as illustrated in FIG. 5, the parasitic capacitances $C_1$ to $C_4$ exist also between terminals of the semiconductor elements 1 to 4. In other words, the parasitic capacitances $C_1$ to $C_4$ also respectively exist between the collectors and the emitters of the IGBTs of the semiconductor elements 1 to 4.

In this case, for example, in a case where an OFF signal is provided to gates of the semiconductor switching elements 1 to 4 while the power conversion system 20 is in a standby state, in a case where the potentials to ground of the P electrode and the N electrode on the DC side are charged with negative polarity by a lightning stroke, the parasitic capacitances of the respective units are charged along the path illustrated in FIG. 5. While typically, the charge voltage with respect to the potentials to ground by a lightning stroke may be different between the P electrode and the N electrode, to simplify the description, FIG. 5 illustrates a case where the both electrodes are charged with a charge voltage $V_{LS}$ by a lightning stroke.

As illustrated in FIG. 5, if the potentials to ground of the P electrode and the N electrode are charged with negative polarity by a lightning stroke, a voltage rises as indicated by an arrow in FIG. 5, and a current flows through various paths as indicated by a dashed line in FIG. 5. In this event, as illustrated in FIG. 5, a current route through which a current flows through the parasitic capacitances $C_2$ and $C_3$ of the neutral point elements 2 and 3 also occurs.

Typically, the parasitic capacitance CNC of the insulating substrate (not illustrated) existing between the copper sheets attached to the cases (heatsink attachment surfaces) of the semiconductor elements 2 and 3, and the semiconductor elements 2 and 3 is greater than the parasitic capacitances $C_2$ and $C_3$, and the parasitic capacitances $C_2$ and $C_3$ of the neutral point elements 2 and 3 are smaller than the parasitic capacitance CNC. Thus, if the same current flows through the parasitic capacitance CNC in the insulating substrate (not illustrated) and the parasitic capacitances $C_2$ and $C_3$ of the neutral point elements 2 and 3 along the path illustrated in FIG. 5, a voltage of the smaller capacitance rises. By this means, a voltage applied to the parasitic capacitances $C_2$ and $C_3$ of the neutral point elements 2 and 3 becomes greater than the potential (potential to ground) of the no connection terminal NC.

Figure 6:
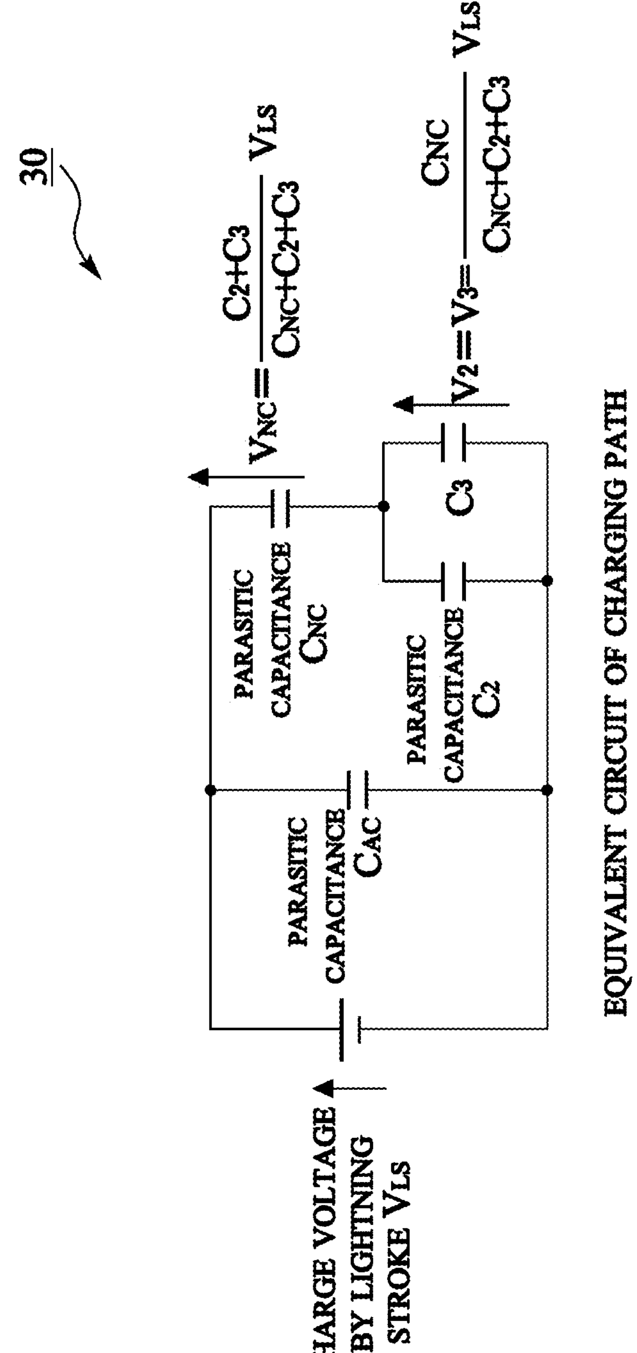
FIG. 6 is a view illustrating an equivalent circuit of the charging path illustrated in FIG. 5.

FIG. 6 is a view illustrating an equivalent circuit of the charging path illustrated in FIG. 5.

Normally, the capacitances of the DC capacitors $C_P$ and $C_N$ are sufficiently greater than the parasitic capacitances of the respective units, and a voltage with which the DC capacitors $C_P$ and $C_N$ are charged by a lightning stroke is sufficiently smaller than a voltage with which the parasitic capacitances of the respective units are charged, and thus, can be ignored. Thus, portions of the DC capacitors $C_P$ and $C_N$ can be regarded as a short-circuit state on the equivalent circuit illustrated in FIG. 6, and the parasitic capacitances of the respective units are charged with the illustrated voltage.

As illustrated in FIG. 6, in a case where the potentials to ground of the P electrode and the N electrode are charged with negative polarity by a lightning stroke, if the charge voltage by the lightning stroke is set as $V_{LS}$, a voltage of the parasitic capacitance CNC at the no connection terminal NC can be expressed with the following expression (1).

[Math. 1]

$$V_{NC} = \frac{C_2 + C_3}{C_{NC} + C_2 + C_3} V_{LS} \tag{1}$$

On the other hand, in this case, voltages of the parasitic capacitances $C_2$ and $C_3$ at the neutral point elements 2 and 3 can be expressed with the following expression (2).

[Math. 2]

$$V_2 = V_3 = \frac{C_{NC}}{C_{NC} + C_2 + C_3} V_{LS} \tag{2}$$

As described above, the parasitic capacitance CNC at the insulating substrate (not illustrated) existing between the copper sheets attached to the cases of the semiconductor elements 2 and 3, and the semiconductor elements 2 and 3 is relatively great, and the parasitic capacitances $C_2$ and $C_3$ of the neutral point elements 2 and 3 are relatively small. Thus, if the potentials to ground of the P electrode and the N electrode on the DC side are charged with negative polarity by a lightning stroke, voltages $V_2=V_3$ applied to the parasitic capacitances $C_2$ and $C_3$ indicated in expression (2) become greater than the voltage $V_{NC}$ applied to the parasitic capacitance CNC indicated in expression (1).

By this means, if the potentials of the P electrode and the N electrode on the DC side largely fluctuate by the surge voltage by the lightning stroke, and the parasitic capacitances $C_2$ and $C_3$ of the neutral point elements 2 and 3 are charged with part of the surge voltage, the semiconductor elements 2 and 3 with smaller module withstand voltages may break down due to an overvoltage. In other words, the charge voltage $V_{LS}$ by the lightning stroke is extremely greater than the element withstand voltages of the neutral point elements 2 and 3, and thus, if the voltages $V_2$ and $V_3$ are applied to the neutral point elements 2 and 3, the voltages $V_2$ and $V_3$ exceed the element withstand voltages of the neutral point elements 2 and 3, and the neutral point elements 2 and 3 may break down due to an overvoltage.

FIG. 7 is a view indicating organized cases that are categorized depending on whether or not the neutral point elements 2 and 3 break down due to an overvoltage by a lightning surge in the circuit configuration of the multilevel power converter 30 illustrated in FIG. 3 and FIG. 4.

In FIG. 7, cases are categorized depending on whether the P electrode and the N electrode on the DC side, or the AC side are charged with positive polarity or negative polarity by a lightning stroke. Further, cases are categorized depending on whether two neutral point elements 2 and 3 are connected to the diodes D2 and D3 on an anode side or on a cathode side. Further, FIG. 7 indicates results of the categorization in a matrix.

A case has been described in FIGS. 5 and 6 described above where the potentials to ground of the P electrode and the N electrode on the DC side are charged with negative polarity by a lightning stroke. However, whether the potentials to ground of the P electrode and the N electrode on the DC side are charged with positive polarity or negative polarity by a lightning stroke is actually unknown, and there is also a case where the potentials are charged with positive polarity.

In a case where the potentials to ground of the P electrode and the N electrode on the DC side are charged with positive polarity in the circuit configuration illustrated in FIG. 5, the charge currents of the parasitic capacitance CNC and the parasitic capacitance CAC pass through the inverse parallel diodes D2 and D4 of the semiconductor elements 2 and 4, and thus, the parasitic capacitances $C_1$ to $C_4$ of the semiconductor elements 1 to 4 are not charged. Thus, in a case where the potentials to ground of the P electrode and the N electrode on the DC side are charged with positive polarity by a lightning stroke in the circuit configuration illustrated in FIG. 5, the parasitic capacitances $C_1$ to $C_4$ are bypassed by the diodes, and thus, the semiconductor elements 1 to 4 do not break down due to an overvoltage.

However, while the above is applied in a case where the cathode sides of the two inverse parallel diodes D2 and D3 of the neutral point elements 2 and 3 are connected as in the circuit configuration illustrated in FIG. 5, the above is not applied in a case where the anode sides of the two inverse parallel diodes D2 and D3 are connected.

Figure 23:
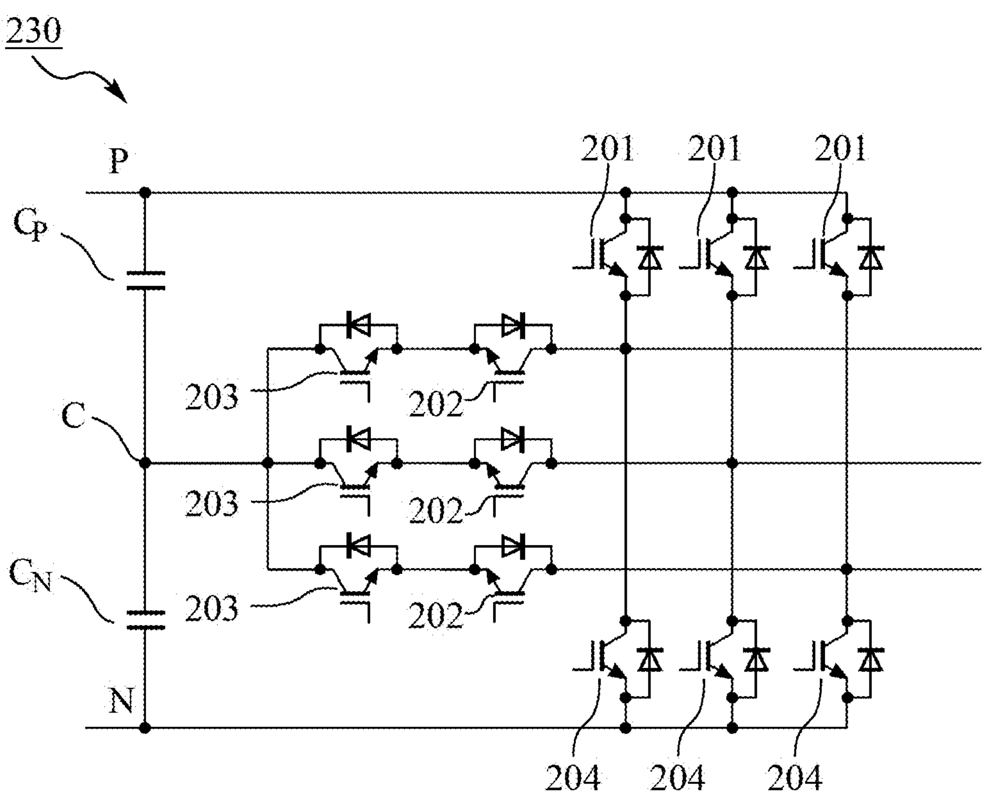
FIG. 23 is a view illustrating one example of a configuration of a multilevel power converter according to another aspect.
Figure 24:
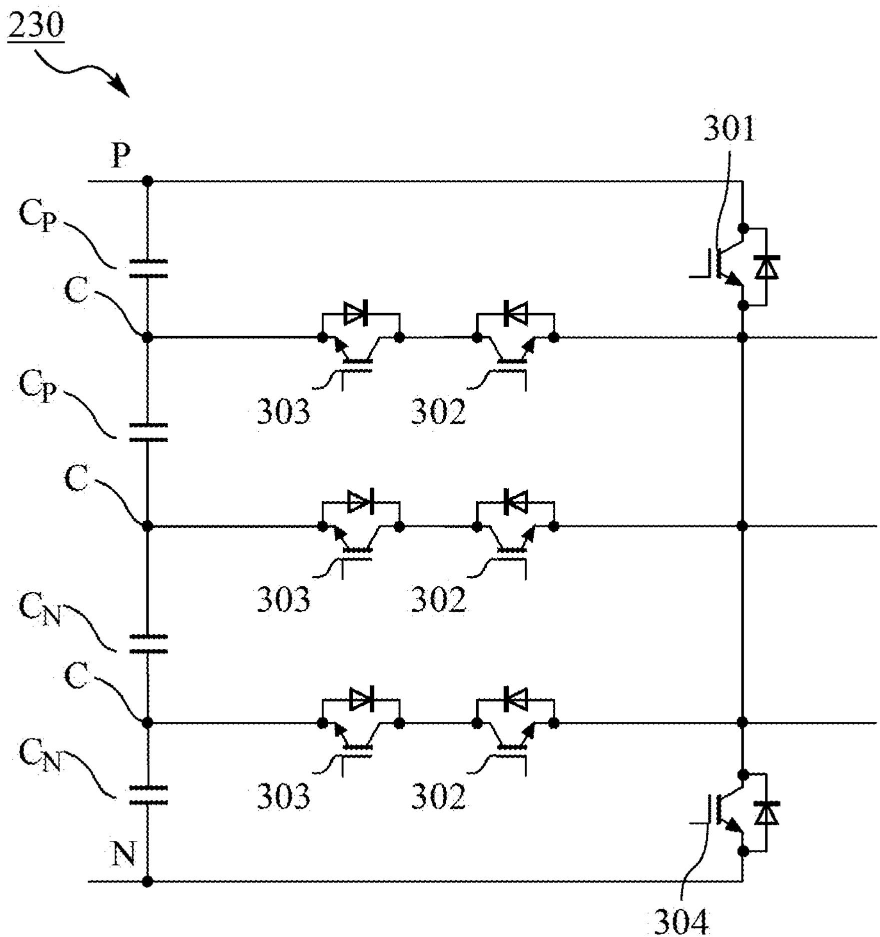
FIG. 24 is a view illustrating one example of a configuration of a multilevel power converter according to another aspect.

For example, as illustrated in FIG. 23, in a case where the anode sides of the two inverse parallel diodes are connected, the semiconductor elements 2 and 3 do not break down due to an overvoltage in a case where charging is performed with negative polarity, and the semiconductor elements 2 and 3 break down due to an overvoltage in a case where charging is performed with positive polarity. In other words, whether the semiconductor elements 2 and 3 break down due to an overvoltage in a case where charging is performed with positive polarity, or the semiconductor elements 2 and 3 break down due to an overvoltage in a case where charging is performed with negative polarity varies depending on directions of the inverse parallel diodes D2 and D3. This is because a circuit in a case where the cathode sides of the two inverse parallel diodes D2 and D3 of the neutral point elements 2 and 3 are connected is a circuit equivalent to a circuit in a case where all signs of voltages and currents in a case where the anode sides are connected are inverted.

Note that in a case where the AC side is charged with positive polarity in the circuit configuration illustrated in FIG. 5, the potential to ground of the P electrode is charged with positive polarity through the inverse parallel diode D1 of the semiconductor element 1. Further, the potential to ground of the N electrode is charged with positive polarity through the inverse parallel diode D1 of the semiconductor element 1 and the DC capacitor. Thus, "in a case where the AC side is charged with positive polarity", a phenomenon that is the same as a phenomenon occurring "in a case where the potentials to ground of the P electrode and the N electrode on the DC side are charged with positive polarity" occurs.

On the other hand, in a case where the AC side is charged with negative polarity in the circuit configuration illustrated in FIG. 5, the potential to ground of the N electrode is charged with negative polarity through the inverse parallel diode D4 of the semiconductor element 4. Further, the potential to ground of the P electrode is charged with negative polarity through the inverse parallel diode D4 of the semiconductor element 4 and the DC capacitor. Thus, "in a case where the AC side is charged with negative polarity", a phenomenon that is the same as a phenomenon occurring "in a case where the potentials to ground of the P electrode and the N electrode on the DC side are charged with negative polarity" occurs.

Thus, in a case where the AC side is charged by a lightning stroke, eventually, the P electrode and the N electrode on the DC side are also charged through the diodes, and thus, the same phenomenon, but with different current paths, occurs regardless of whether voltage rise by a lighting stroke occurs on the DC side or on the AC side. FIG. 7 indicates a table organizing the above description.

As illustrated in FIG. 7, in a case where the P electrode and the N electrode on the DC side, or the AC side are charged with positive polarity, and in a case where the anode sides of the diodes D2 and D3 of the two neutral point elements 2 and 3 are connected, the parasitic capacitances $C_2$ and $C_3$ of the neutral point elements 2 and 3 are charged, and the neutral point elements 2 and 3 may break down due to an overvoltage. On the other hand, in a case where the P electrode and the N electrode on the DC side, or the AC side are charged with positive polarity, and in a case where the cathode sides of the diodes D2 and D3 of the two neutral point elements 2 and 3 are connected, the parasitic capacitances $C_2$ and $C_3$ of the neutral point elements 2 and 3 are not charged, and the neutral point elements 2 and 3 do not break down due to an overvoltage.

Further, in a case where the P electrode and the N electrode on the DC side, or the AC side are charged with negative polarity, and in a case where the anode sides of the diodes D2 and D3 of the two neutral point elements 2 and 3 are connected, the parasitic capacitances $C_2$ and $C_3$ of the neutral point elements 2 and 3 are not charged, and the neutral point elements 2 and 3 do not break down due to an overvoltage. On the other hand, in a case where the P electrode and the N electrode on the DC side, or the AC side are charged with negative polarity, and in a case where the cathode sides of the diodes D2 and D3 of the two neutral point elements 2 and 3 are connected, the parasitic capacitances $C_2$ and $C_3$ of the neutral point elements 2 and 3 are charged, and the neutral point elements 2 and 3 may break down due to an overvoltage.

Figure 8:
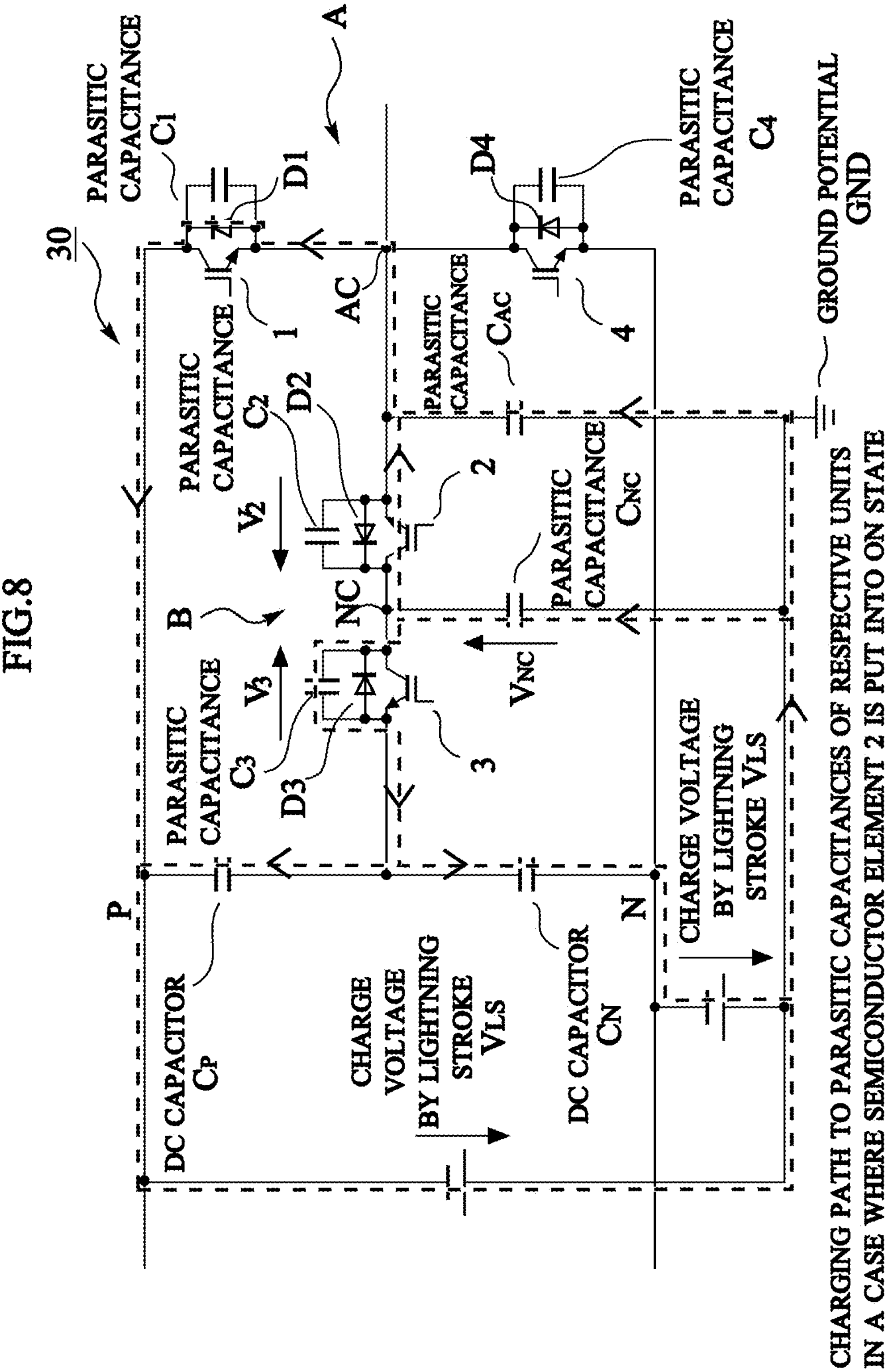
FIG. 8 is a view illustrating one example of a charging path to the parasitic capacitances of respective units by a lightning stroke in a case where a semiconductor element 2 is put into an ON state in the circuit configuration of the multilevel power converter illustrated in FIG. 3 and FIG. 4.

FIG. 8 is a view illustrating one example of a charging path to the parasitic capacitances of the respective units by a lightning stroke in a case where the semiconductor element 2 is put into an ON state in the circuit configuration of the multilevel power converter 30 illustrated in FIG. 3 and FIG. 4. FIG. 8 illustrates a charging path to the parasitic capacitances of the respective units in a case where the semiconductor element 2 is put into an ON state (conducting state) in a case where the potentials to ground of the P electrode and the N electrode are charged with negative polarity by a lightning stroke in a similar manner to FIG. 5.

In FIG. 8, in a case where the power converter 30 is in a standby mode (standby state), a gate signal that puts the semiconductor element 2 into an ON state is provided. Thus, the parasitic capacitances $C_2$ and $C_3$ of the semiconductor elements 2 and 3 are bypassed by the semiconductor element 2 and are not charged. This results in making it possible to avoid the semiconductor elements 2 and 3 from breaking down due to an overvoltage due to application of a charge voltage by a lightning stroke.

In other words, in a case where the potentials to ground of the P electrode and the N electrode are charged with negative polarity by a lighting stroke in the circuit configuration illustrated in FIG. 5, the parasitic capacitances $C_2$ and $C_3$ of the semiconductor elements 2 and 3 are charged with the current. On the other hand, in FIG. 8, by putting the semiconductor element 2 into an ON state, the parasitic capacitances $C_2$ and $C_3$ are bypassed, and thus, the parasitic capacitances $C_2$ and $C_3$ of the semiconductor elements 2 and 3 are not charged with the current.

Note that while in FIG. 8, the gate signal that puts the semiconductor element 2 into an ON state is provided, and thus, some voltages may be applied to the parasitic capacitance $C_3$ of the semiconductor element 3, the parasitic capacitance $C_3$ of the semiconductor element 3 is at least not charged to a voltage that leads to breakdown due to an overvoltage. Thus, as illustrated in FIG. 8, in a case where the power converter 30 is in a standby mode, by providing the gate signal that puts the semiconductor element 2 into an ON state, even if the potentials to ground of the P electrode and the N electrode are charged by a lightning stroke, it is possible to protect the neutral point elements 2 and 3 from breakdown due to an overvoltage.

Figure 9:
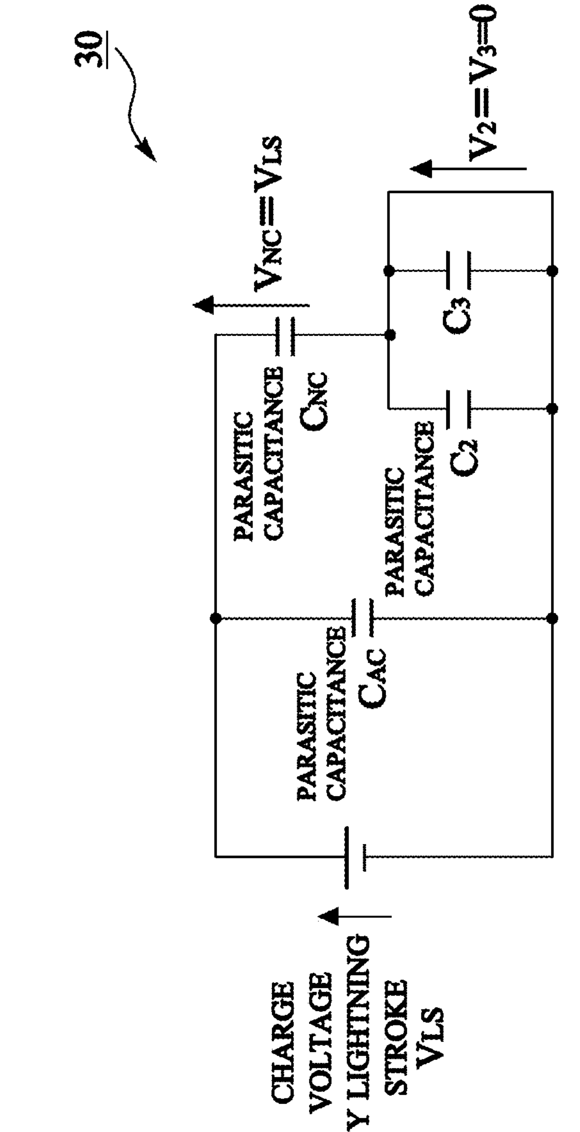
FIG. 9 is a view illustrating an equivalent circuit of the charging path illustrated in FIG. 8.

FIG. 9 is a view illustrating an equivalent circuit of the charging path illustrated in FIG. 8.

As illustrated in FIG. 9, in a case where the potentials to ground of the P electrode and the N electrode are charged with negative polarity by a lightning stroke, if the charge voltage by the lightning stroke is set as $V_{LS}$, a voltage of the parasitic capacitance CNC at the no connection terminal NC can be expressed with the following expression (3).

[Math. 3]

$$V_{NC} = V_{LS} \tag{3}$$

On the other hand, in this case, voltages of the parasitic capacitances $C_2$ and $C_3$ at the neutral point elements 2 and 3 can be expressed with the following expression (4).

[Math. 4]

$$V_2 = V_3 = 0 \tag{4}$$

In other words, according to expression (3) and expression (4), by putting the semiconductor element 2 into an ON state, the parasitic capacitances $C_2$ and $C_3$ are bypassed, and the parasitic capacitances $C_2$ and $C_3$ of the semiconductor elements 2 and 3 are not charged with the current.

Figure 10:
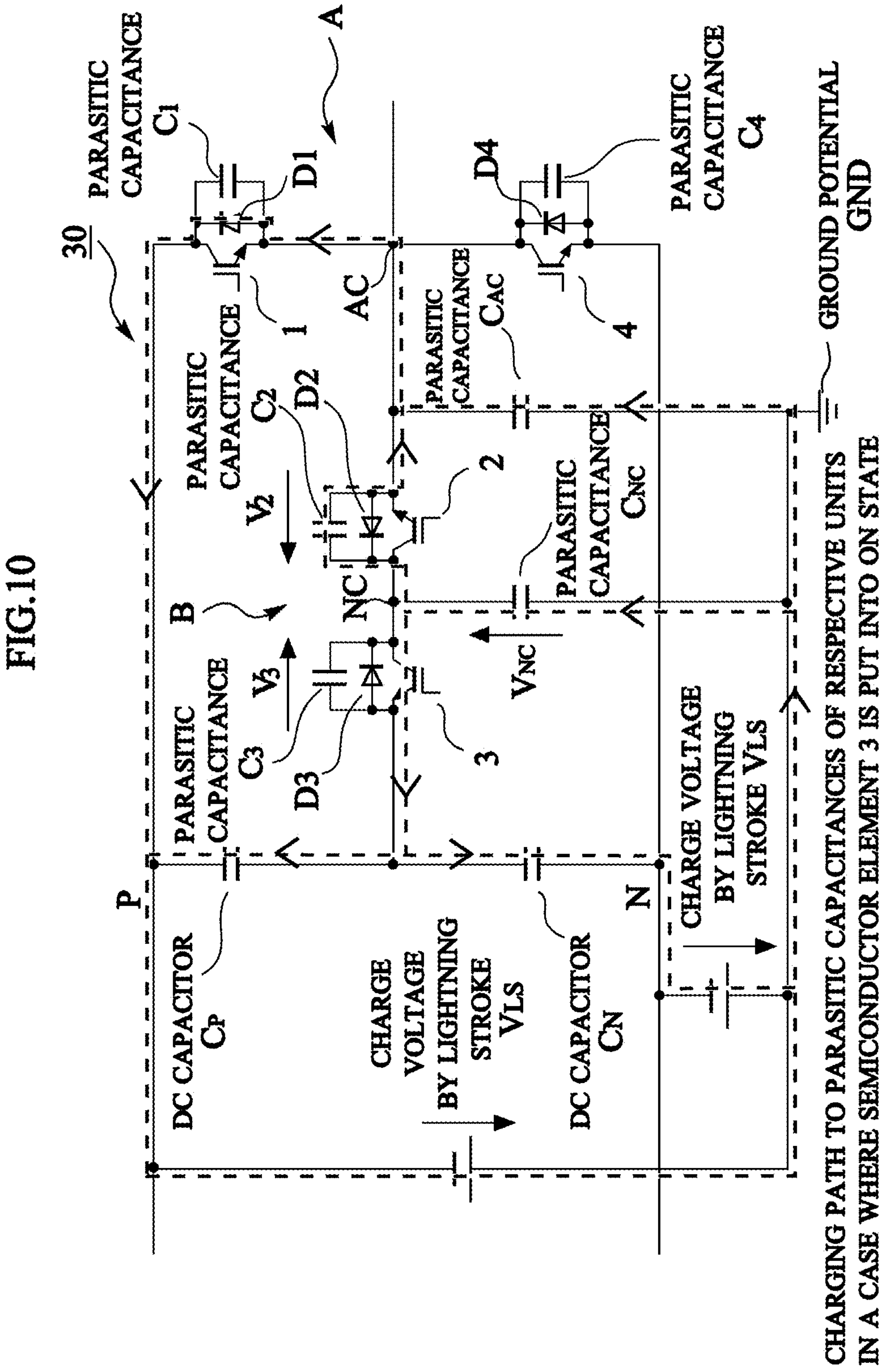
FIG. 10 is a view illustrating one example of a charging path to the parasitic capacitances of the respective units by a lightning stroke in a case where a semiconductor element 3 is put into an ON state in the circuit configuration of the multilevel power converter illustrated in FIG. 3 and FIG. 4.

FIG. 10 is a view illustrating one example of a charging path to the parasitic capacitances of the respective units by a lightning stroke in a case where the semiconductor element 3 is put into an ON state in the circuit configuration of the multilevel power converter 30 illustrated in FIG. 3 and FIG. 4. FIG. 10 illustrates a charging path to the parasitic capacitances of the respective units in a case where the semiconductor element 3 is put into an ON state (conducting state) in a case where the potentials to ground of the P electrode and the N electrode are charged with negative polarity by a lightning stroke in a similar manner to FIG. 5.

In the above-described FIG. 8, in a case where the power converter 30 is in a standby mode (standby state), the gate signal that puts the semiconductor element 2 into an ON state is provided. On the other hand, in FIG. 10, the gate signal that puts the semiconductor element 3 into an ON state is provided. Also by this means, the parasitic capacitances $C_2$ and $C_3$ of the semiconductor elements 2 and 3 are bypassed by the semiconductor element 3 and are not charged. This results in making it possible to avoid the semiconductor elements 2 and 3 from breaking down due to an overvoltage by application of a charge voltage by a lightning stroke. Note that in FIG. 10, other components and operation are similar to those in FIG. 8, and thus, description will be omitted.

FIG. 11 is a view illustrating an equivalent circuit of the charging path illustrated in FIG. 10. The equivalent circuit illustrated in FIG. 11 is basically similar to the equivalent circuit illustrated in FIG. 9.

In other words, as illustrated in FIG. 11, in a case where the potentials to ground of the P electrode and the N electrode are charged with negative polarity by a lightning stroke, if the charge voltage by the lighting stroke is set as $V_{LS}$, a voltage of the parasitic capacitance CNC at the no connection terminal NC can be expressed with expression (3) in a similar manner to FIG. 9.

[Math. 5]

$$V_{NC} = V_{LS} \tag{3}$$

Further, in this case, voltages of the parasitic capacitances $C_2$ and $C_3$ at the neutral point elements 2 and 3 can be expressed with expression (4) in a similar manner to FIG. 9.

[Math. 6]

$$V_2 = V_3 = 0 \tag{4}$$

Thus, in a similar manner to FIG. 9, according to expression (3) and expression (4), it can be seen that also by putting the semiconductor element 3 into an ON state, the parasitic capacitances $C_2$ and $C_3$ are bypassed, and the parasitic capacitances $C_2$ and $C_3$ of the semiconductor elements 2 and 3 are not charged with the current.

As illustrated from FIG. 8 to FIG. 11 described above, in a case where the power converter 30 is in a standby mode (standby state), by providing a gate signal that puts one of the semiconductor elements 2 and 3 into an ON state, the parasitic capacitances $C_2$ and $C_3$ of the semiconductor elements 2 and 3 are bypassed and are not charged. This can make it possible to avoid the semiconductor elements 2 and 3 from breaking down due to an overvoltage by application of a charge voltage by a lightning stroke.

Here, even if a gate signal that puts both the semiconductor elements 2 and 3 into an ON state is provided, both the parasitic capacitances $C_2$ and $C_3$ of the semiconductor elements 2 and 3 are bypassed, and thereby effects similar to those described above can be provided. In other words, in a case where the power converter 30 is in a standby mode (standby state), by providing a gate signal that puts one or both of the semiconductor elements 2 and 3 into an ON state, it is possible to avoid the semiconductor elements 2 and 3 from breaking down due to an overvoltage by application of a charge voltage by a lightning stroke. In this case, it is only necessary that one or both of the semiconductor elements 2 and 3 are in a conducting state, and, for example, either a gate signal that continuously puts one or both of the semiconductor elements 2 and 3 into an ON state or a gate signal that alternately or irregularly puts one or both of the semiconductor elements 2 and 3 into an ON state may be provided. In other words, it is only necessary that a gate signal that puts at least one of the semiconductor element 2 or 3 into a conducting state or a switching state is provided.

Further, FIG. 8 to FIG. 11 illustrate a case where the potentials to ground of the P electrode and the N electrode are charged with negative polarity by a lightning stroke in a similar manner to FIG. 5 and FIG. 6. However, the present disclosure is not limited to this. As illustrated in FIG. 7, either in a case where the P electrode and the N electrode, or the AC side are charged with positive polarity by a lightning stroke, or in a case where the P electrode and the N electrode, or the AC side are charged with negative polarity by a lightning stroke, by providing a gate signal that puts one or both of the semiconductor elements 2 and 3 into an ON state, effects similar to those from FIG. 8 to FIG. 11 are provided.

Control Example of First Embodiment

Figure 12:
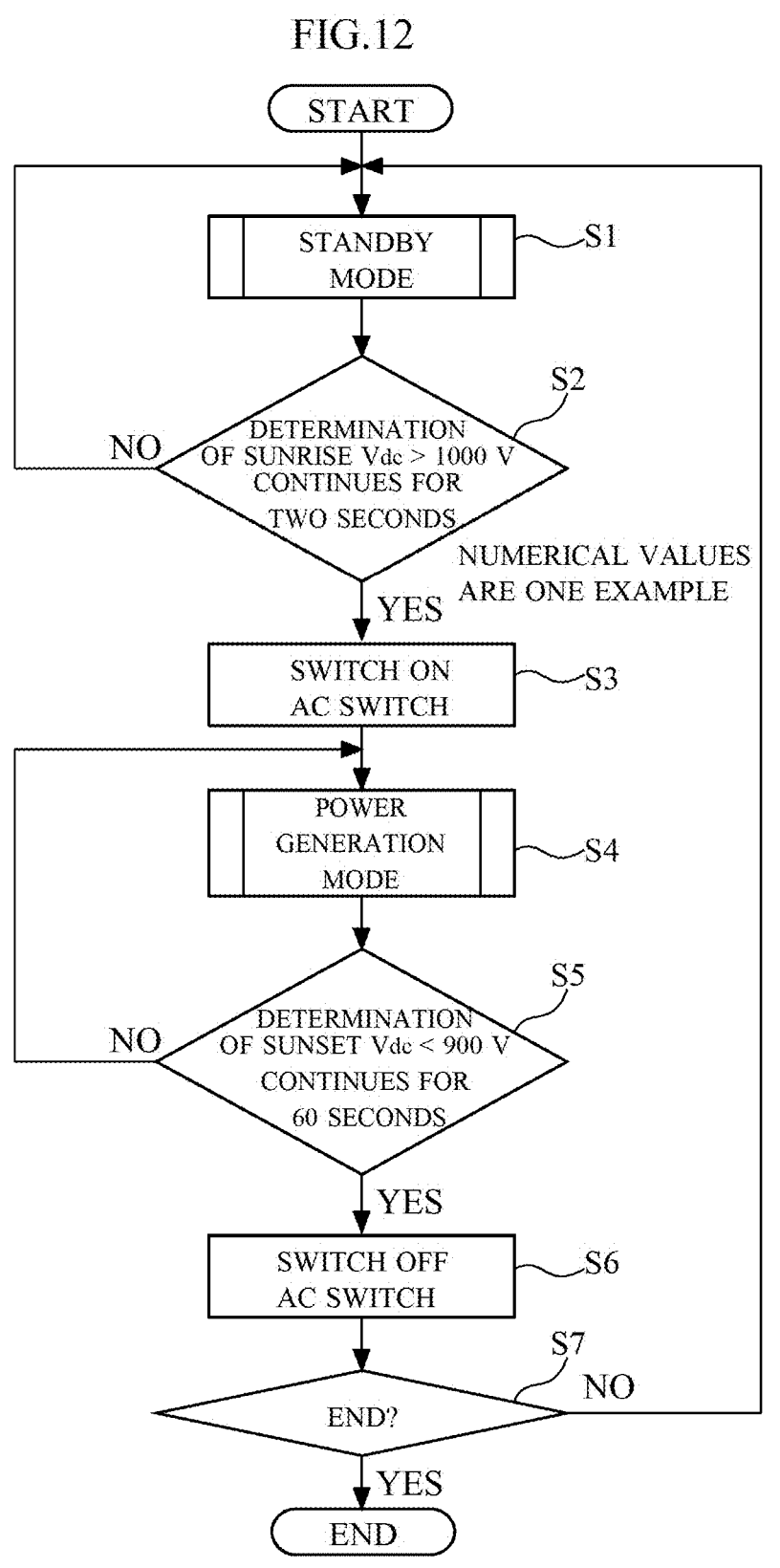

FIG. 12 is a flowchart indicating a sequence of state transition between a power generation mode and a standby mode of the multilevel power conversion system 20 illustrated in FIG. 1. The flowchart indicated in FIG. 12 is, for example, started by the control unit 50 (see FIG. 2) of the controller 40 upon start-up (upon activation) of the power conversion system 20.

In step S1, the operation control unit 51 of the control unit 50 determines that the AC switch 24 is in an OFF (disconnected) state and causes the operation mode of the power converter 30 to transition to a standby mode. The operation control unit 51 may output a predetermined standby mode signal and a gate block signal to the gate signal generation unit 53 (see FIG. 2, FIG. 14, and the like) when the operation control unit 51 causes the operation mode of the power converter 30 to transition to the standby mode. Note that the standby mode, for example, refers to an operation mode in which the AC switch 24 is put into an OFF (disconnected) state during the night or the bad weather, and power conversion is not performed from the photovoltaics 11 to the electric power system 15 by the power converter 30. In other words, the standby mode is an operation mode in which power conversion is not performed between the DC input/output unit 31 (see FIGS. 3 and 4) and the AC input/output unit 32 (see FIGS. 3 and 4).

Here, in a power converter in related art, the controller switches OFF gate signals of all the semiconductor switching elements (provides a gate signal that puts all the semiconductor switching elements into an OFF state) when the power converter is in the standby mode. On the other hand, the control unit 50 of the controller 40 of the present disclosure provides a gate signal that puts one or both of the neutral point elements 2 and 3 connected in inverse series into an ON state and provides a gate signal that puts the semiconductor elements 1 and 4 other than the neutral point elements 2 and 3 into an OFF state during the standby mode. This can avoid the semiconductor elements 1 to 4 from breaking down due to an overvoltage by a lightning surge during the standby mode. Note that details of a control configuration or processing (operation) by the voltage command generation unit 52 and the gate signal generation unit 53 during the standby mode will be described later (see FIG. 13, FIG. 14, and the like).

In step S2, the operation control unit 51 of the control unit 50 determines whether or not the sun has risen. Specifically, the operation control unit 51 acquires the DC voltage $V_{dc}$ detected by the DC voltage sensor 25, for example, via the acquisition unit 41 (see FIG. 2) and determines whether or not the DC voltage $V_{dc}$ has continuously exceeded 1000 V ($V_{dc}$>1000 V) for equal to or longer than two seconds. Then, the operation control unit 51 determines whether or not the sun has risen, for example, according to whether or not the acquired DC voltage $V_{dc}$ has continuously exceeded 1000 V for equal to or longer than two seconds.

For example, in a case where the operation control unit 51 determines that the DC voltage $V_{dc}$ has continuously exceeded 1000 V for equal to or longer than two seconds (Yes), the operation control unit 51 determines that the sun has risen, and the processing transitions to step S3. On the other hand, for example, in a case where the operation control unit 51 determines that the DC voltage $V_{dc}$ has not continuously exceeded 1000 V for equal to or longer than two seconds (No), the operation control unit 51 determines that the sun has not risen and repeats the processing in step S1 and step S2 until it is determined that the sun has risen. Note numerical values such as two seconds and 1000 V are one example.

In step S3, the operation control unit 51 of the control unit 50 outputs the AC switch operation signal to the AC switch 24, for example, via the output unit 42 (see FIG. 2) and puts the AC switch 24 into an ON (switch ON) state.

In step S4, the operation control unit 51 of the control unit 50 determines that the AC switch 24 is in an ON (switch ON) state and causes the operation mode of the power converter 30 to transition to the power generation mode. The operation control unit 51 may output a predetermined standby mode signal and the gate block signal to the gate signal generation unit 53 (see FIG. 2, FIG. 14, and the like) when the operation control unit 51 causes the operation mode of the power converter 30 to transition to the power generation mode. Alternatively, the operation control unit 51 may output a predetermined operation mode signal (power generation mode signal) to the gate signal generation unit 53 when the operation control unit 51 causes the operation mode of the power converter 30 to transition to the power generation mode. Note that the power generation mode refers to an operation mode in which power is generated from the photovoltaics 11, the AC switch 24 is in an ON (switch ON) state, power of the photovoltaics 11 is converted by performing switching by providing a gate signal to the semiconductor elements 1 to 4 of the power converter 30, and the power is sent to the electric power system 15 side. In other words, the power generation mode refers to an operation mode in which power conversion is performed between the DC input/output unit 31 (see FIGS. 3 and 4) and the AC input/output unit 32 (see FIGS. 3 and 4). Note that control or processing (operation) by the control unit 50 during the power generation mode is similar to that in a power converter in related art, and thus, description will be omitted.

In step S5, the operation control unit 51 of the control unit 50 determines whether or not the sun has set. Specifically, the operation control unit 51 acquires the DC voltage $V_{dc}$ detected by the DC voltage sensor 25, for example, via the acquisition unit 41 (see FIG. 2) and determines whether or not the DC voltage $V_{dc}$ has been continuously less than 900 V ($V_{dc}$<900 V) for equal to or longer than 60 seconds. Then, the operation control unit 51 determines whether or not the sun has set according to whether or not the acquired DC voltage $V_{dc}$ has been continuously less than 900 V for equal to or longer than 60 seconds.

For example, in a case where the operation control unit 51 determines that the DC voltage $V_{dc}$ has been continuously less than 900 V for equal to or longer than 60 seconds (Yes), the operation control unit 51 determines that the sun has set, and the processing transitions to step S6. On the other hand, for example, in a case where the operation control unit 51 determines that the DC voltage $V_{dc}$ has not been continuously less than 900 V for equal to or longer than 60 seconds (No), the operation control unit 51 determines that the sun has not set and repeats the processing in step S4 and step S5 until it is determined that the sun has set. Note that numerical values such as 60 seconds and 900 V are one example.

In step S6, the operation control unit 51 of the control unit 50 outputs the AC switch operation signal to the AC switch 24, for example, via the output unit 42 (see FIG. 2) and puts the AC switch 24 into an OFF (disconnected) state.

In step S7, the control unit 50 determines whether or not operation of the power conversion system 20 has ended. Examples of a case where the operation of the power conversion system 20 has ended can include, for example, a case of maintenance, a failure, or the like, of the power conversion system 20, a case where an instruction, or the like, is received from a host apparatus (not illustrated) or an operator, or the like. In a case where the control unit 50 determines that the operation of the power conversion system 20 has ended (Yes), the control unit 50 finishes the processing of the present flowchart. On the other hand, in a case where the control unit 50 determines that the operation of the power conversion system 20 has not ended (No), the processing returns to step S1, and the control unit 50 repeats the processing from step S1 to S7.

Figure 13:
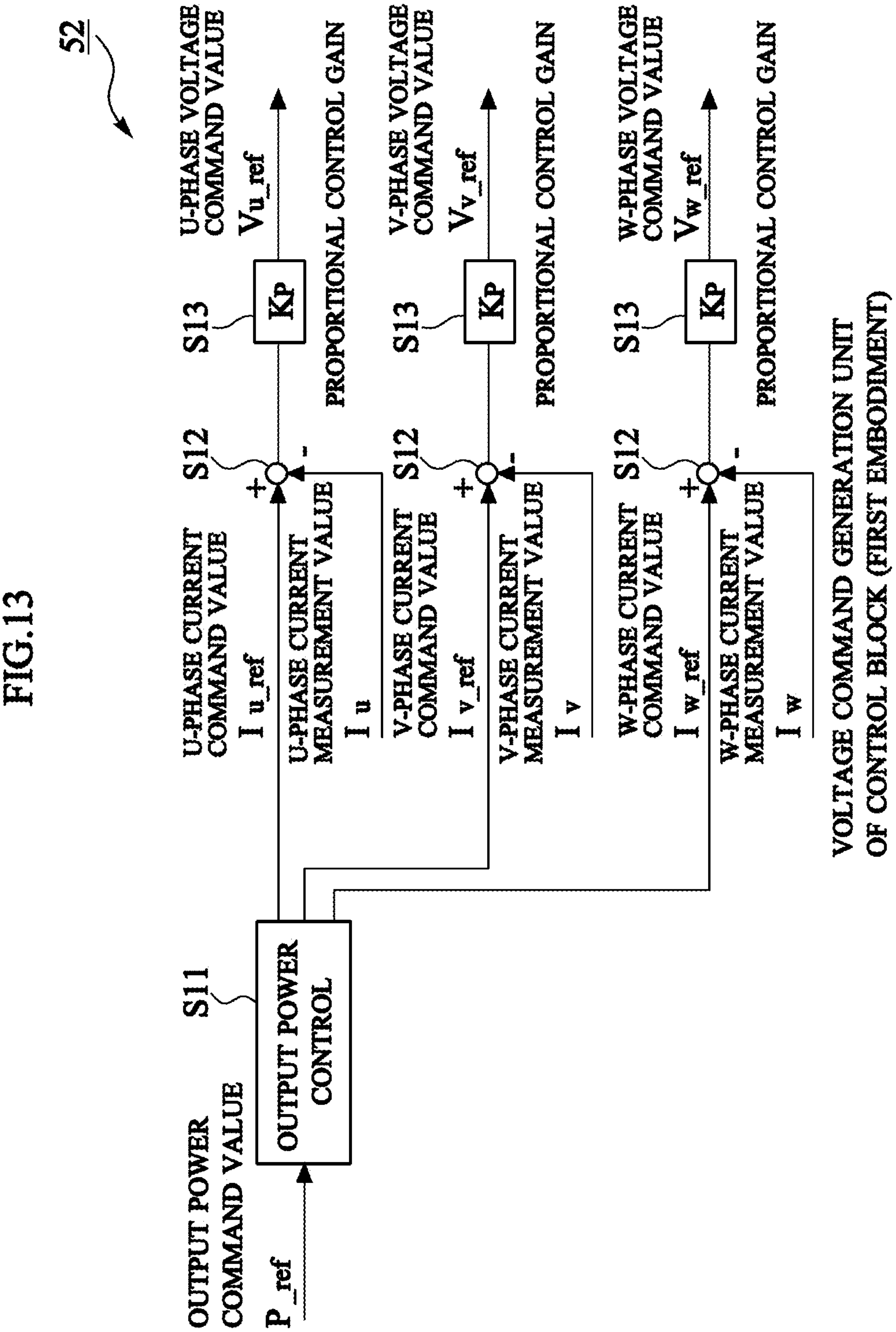
FIG. 13 is a view illustrating one example of a control configuration in a voltage command generation unit of a control unit illustrated in FIG. 2.

FIG. 13 is a view illustrating one example of a control configuration in the voltage command generation unit 52 of the control unit 50 illustrated in FIG. 2. While FIG. 13 illustrates a control configuration example of three phases of a U phase, a V phase and a W phase, in the following description, control of the U phase will be described as an example for control common among the respective phases.

In step S11, the voltage command generation unit 52 acquires a predetermined output power command value $P_{\_ref}$ and outputs a U-phase current command value $I_{u\_ref}$ based on the acquired output power command value $P_{\_ref}$. Note that the predetermined output power command value $P_{\_ref}$ is, for example, acquired based on predetermined power demand, predetermined calculation results, and the like, or acquired from the storage unit 43, a host apparatus (not illustrated), or the like.

In step S12, the voltage command generation unit 52 acquires the U-phase current command value $I_{u\_ref}$ output through the processing in step S11. Further, the voltage command generation unit 52 acquires a U-phase AC current $I_u$ (U-phase current measurement value $I_u$) detected by the AC current sensor (see FIG. 1), for example, via the acquisition unit 41 (see FIG. 2). Then, the voltage command generation unit 52 subtracts the acquired U-phase current measurement value $I_u$ from the acquired U-phase current command value $I_{u\_ref}$ and outputs a value after the subtraction.

In step S13, the voltage command generation unit 52 performs proportional control based on the value output through the processing in step S12 and a proportional control gain Kp and outputs a U-phase voltage command value $V_{u\_ref}$ obtained through the proportional control to the gate signal generation unit 53 (see FIG. 2, FIG. 14, and the like).

Note that the voltage command generation unit 52 obtains a V-phase voltage command value Vv_ref and a W-phase voltage command value Vw_ref from step S11 to S13 in a similar manner to the U phase and outputs the obtained V-phase voltage command value Vv_ref and W-phase voltage command value Vw_ref to the gate signal generation unit 53.

Note that the processing to be performed in the voltage command generation unit 52 described in FIG. 13 is similar to processing to be typically performed in control of a normal power converter.

FIG. 14 is a view illustrating one example of a control configuration in the gate signal generation unit 53 of the control unit 50 illustrated in FIG. 2. While FIG. 14 illustrates a control configuration example of three phases of the U phase, the V phase and the W phase, in the following description, control of the U phase will be described as an example for control common among the respective phases.

In step S21, the gate signal generation unit 53 acquires the U-phase voltage command value $V_{u\_ref}$ (x) output from the voltage command generation unit 52. Further, the gate signal generation unit 53 acquires a value (y) that is the DC voltage $V_{dc}$ halved by applying a low-pass filter to the DC voltage $V_{dc}$ detected by the DC voltage sensor 25. The gate signal generation unit 53 divides the acquired value (x) by the acquired value (y) (x/y) to obtain a U-phase modulated wave $D_u$ and outputs the obtained U-phase modulated wave $D_u$. Note that a modulated wave D is, for example, a voltage command value normalized by a half of the DC voltage and is obtained by dividing the voltage command value $V_{\_ref}$ by a value that is the DC voltage $V_{dc}$ halved by applying the low-pass filter to the DC voltage $V_{dc}$.

In step S22*a*, the gate signal generation unit 53 compares the U-phase modulated wave $D_u$ output through the processing in step S21 with the triangle wave carrier CA1 generated by a carrier generator, by a comparator. Then, the gate signal generation unit 53 outputs a signal of 1 in a case where the U-phase modulated wave $D_u$ is greater than the triangle wave carrier CA1 and outputs a signal of 0 in a case where the U-phase modulated wave $D_u$ is smaller than the triangle wave carrier CA1. Note that the triangle wave carrier CA1 is a triangle wave signal that changes from 0 to 1 in a certain carrier cycle.

In step S22*b*, the gate signal generation unit 53 compares the U-phase modulated wave $D_u$ output through the processing in step S21 with the triangle wave carrier CA2 generated by the carrier generator, by the comparator. Then, the gate signal generation unit 53 outputs a signal of 1 in a case where the U-phase modulated wave $D_u$ is greater than the triangle wave carrier CA2 and outputs a signal of 0 in a case where the U-phase modulated wave $D_u$ is smaller than the triangle wave carrier CA2. Note that the triangle wave carrier CA2 is a triangle wave signal that changes from −1 to 0 in a certain carrier cycle.

In step S23*a*, the gate signal generation unit 53 outputs a signal obtained by delaying a value of the signal output through the processing in step S22*a* by a dead time generator. Note that the dead time generator prevents short-circuit by simultaneous conduction of the semiconductor switching elements and outputs a signal for which a rise time of a pulse command value is delayed.

In step S23*b*, the gate signal generation unit 53 outputs a signal obtained by delaying a value of a negative logic (NOT) of the signal output through the processing in step S22*a* by the dead time generator. In other words, the gate signal generation unit 53 outputs a signal delayed by 1 in a case where the signal output in step S22*a* is 0 and delayed by 0 in a case where the signal is 1 by the dead time generator.

In step S23*c*, the gate signal generation unit 53 outputs a signal obtained by delaying the signal output through the processing in step S22*b* by the dead time generator.

In step S23*d*, the gate signal generation unit 53 outputs a signal obtained by delaying a value of a negative logic (NOT) of the signal output through the processing in step S22*b* by the dead time generator. In other words, the gate signal generation unit 53 outputs a signal delayed by 1 in a case where the signal output in step S22*b* is 0 and delayed by 0 in a case where the signal is 1 by the dead time generator.

In step S24*a*, the gate signal generation unit 53 outputs a logical product (AND) of the value of the signal output in step S23*a* and a value of a negative logic (NOT) of the standby mode signal. In other words, the gate signal generation unit 53 inputs the value of the signal output in step S23*a* and the value of the negative logic of the standby mode signal to an AND circuit. In this case, in a case where the standby mode signal is 1, the negative logic of the standby mode signal is 0, and thus, 0 is output from the AND circuit regardless of a value output from the dead time generator. On the other hand, in a case where the standby mode signal is 0, the negative logic of the standby mode signal is 1, and thus, a value that is the same as the value output from the dead time generator is output from the AND circuit. Note that the standby mode signal is, for example, acquired from the operation control unit 51.

In step S24*b*, the gate signal generation unit 53 outputs a logical sum (OR) of the value of the signal output through the processing in step S23*b* and the value of the standby mode signal. In other words, the gate signal generation unit 53 inputs the value of the signal output through the processing in step S23*b* and the value of the standby mode signal to an OR circuit. Then, in a case where at least one of the value of the standby mode signal or the value output from the dead time generator is 1, 1 is output from the OR circuit. In this case, in a case where the standby mode signal is 1, 1 is output from the OR circuit regardless of the value output from the dead time generator. On the other hand, in a case where the standby mode signal is 0, a value that is the same as the value output from the dead time generator is output from the OR circuit.

In step S24*c*, the gate signal generation unit 53 outputs a logical sum (OR) of the value of the signal output through the processing in step S23*c* and the value of the standby mode signal. In other words, the gate signal generation unit 53 inputs the value of the signal output through the processing in step S23*c* and the value of the standby mode signal to an OR circuit. Then, in a case where at least one of the value of the standby mode signal or the value output from the dead time generator is 1, 1 is output from the OR circuit. In this case, in a case where the standby mode signal is 1, 1 is output from the OR circuit regardless of the value output from the dead time generator. On the other hand, in a case where the standby mode signal is 0, a value that is the same as the value output from the dead time generator is output from the OR circuit.

In step S24*d*, the gate signal generation unit 53 outputs a logical product (AND) of the value of the signal output through the processing in step S23*d* and the value of the negative logic (NOT) of the standby mode signal. In other words, the gate signal generation unit 53 inputs the value of the signal output through the processing in step S23*d* and the value of the negative logic of the standby mode signal to an AND circuit. In this case, in a case where the standby mode signal is 1, the negative logic of the standby mode signal is 0, and thus, 0 is output from the AND circuit regardless of the value output from the dead time generator. On the other hand, in a case where the standby mode signal is 0, the negative logic of the standby mode signal is 1, and thus, a value that is the same as the value output from the dead time generator is output from the AND circuit.

In step S25*a*, the gate signal generation unit 53 outputs a gate signal gu1 based on a logical product (AND) of the value of the signal output through the processing in step S24*a* and a value of a negative logic (NOT) of the gate block signal. In other words, the gate signal generation unit 53 inputs the value of the signal output through the processing in step S24*a* and the value of the negative logic of the gate block signal to an AND circuit. Then, in a case where the gate block signal is 1, the negative logic of the gate block signal is 0, and thus, 0 is output from the AND circuit as the gate signal gu1 regardless of the value of the signal output through the processing in step S24*a*. On the other hand, in a case where the gate block signal is 0, the negative logic of the gate block signal is 1, and thus, a value that is the same as the value of the signal output through the processing in step S24*a* is output from the AND circuit as the gate signal gu1. Note that the gate signal gu1 is a gate signal that controls switching operation of the semiconductor element 1 (see FIG. 3 to FIG. 11, and the like). Note that the gate block signal is, for example, acquired from the operation control unit 51.

In step S25*b*, the gate signal generation unit 53 outputs a gate signal gu3 based on a logical product (AND) of the value of the signal output through the processing in step S24*b* and the value of the negative logic (NOT) of the gate block signal. In other words, the gate signal generation unit 53 inputs the value of the signal output through the processing in step S24*b* and the value of the negative logic of the gate block signal to an AND circuit. Then, in a case where the gate block signal is 1, the negative logic of the gate block signal is 0, and thus, 0 is output from the AND circuit as the gate signal gu3 regardless of the value of the signal output through the processing in step S24*b*. On the other hand, in a case where the gate block signal is 0, the negative logic of the gate block signal is 1, and thus, a value that is the same as the value of the signal output through the processing in step S24*b* is output from the AND circuit as the gate signal gu3. Note that the gate signal gu3 is a gate signal that controls switching operation of the semiconductor element (neutral point element) 3 (see FIG. 3 to FIG. 11, and the like). Note that the gate block signal is, for example, acquired from the operation control unit 51.

In step S25*c*, the gate signal generation unit 53 outputs a gate signal gu2 based on a logical product (AND) of the value of the signal output through the processing in step S24*c* and the value of the negative logic (NOT) of the gate block signal. In other words, the gate signal generation unit 53 inputs the value of the signal output through the processing in step S24*c* and the value of the negative logic of the gate block signal to an AND circuit. Then, in a case where the gate block signal is 1, the negative logic of the gate block signal is 0, and thus, 0 is output from the AND circuit as the gate signal gu2 regardless of the value of the signal output in step S24*c*. On the other hand, in a case where the gate block signal is 0, the negative logic of the gate block signal is 1, and thus, a value that is the same as the value of the signal output through the processing in step S24*c* is output from the AND circuit as the gate signal gu2. Note that the gate signal gu2 is a gate signal that controls switching operation of the semiconductor element (neutral point element) 2 (see FIG. 3 to FIG. 11, and the like). Note that the gate block signal is, for example, acquired from the operation control unit 51.

In step S25*d*, the gate signal generation unit 53 outputs a gate signal gu4 based on a logical product (AND) of the value of the signal output through the processing in step S24*d* and the value of the negative logic (NOT) of the gate block signal. In other words, the gate signal generation unit 53 inputs the value of the signal output through the processing in step S24*d* and the value of the negative logic of the gate block signal to an AND circuit. Then, in a case where the gate block signal is 1, the negative logic of the gate block signal is 0, and thus, 0 is output from the AND circuit as the gate signal gu4 regardless of the value of the signal output in step S24*d*. On the other hand, in a case where the gate block signal is 0, the negative logic of the gate block signal is 1, and thus, a value that is the same as the value of the signal output through the processing in step S24*d* is output from the AND circuit as the gate signal gu4. Note that the gate signal gu4 is a gate signal that controls switching operation of the semiconductor element 4 (see FIG. 3 to FIG. 11, and the like). Note that the gate block signal is, for example, acquired from the operation control unit 51.

Note that the gate signal generation unit 53 performs the processing indicated from step S21 to S25*d* described above on each of the V phase and the W phase in a similar manner to the U phase and outputs gate signals gv1 to gv4 and gate signals gw1 to gw4 that control operation of the semiconductor elements 1 to 4.

The processing of the gate signal generation unit 53 described above in FIG. 14 includes processing to be typically performed in control of a normal three-level power converter. For example, control of inputting a result of comparing the modulated wave D obtained by normalizing the voltage command value $V_{\_ref}$ of each phase with two carriers of the triangle wave carrier CA1 and the triangle wave carrier CA2 to the dead time generator and outputting the gate signal g is typically performed. On the other hand, the processing of the gate signal generation unit 53 illustrated in FIG. 14 in the present embodiment has the following features.

In other words, in the control configuration illustrated in FIG. 14, a standby mode signal is used to address a lightning surge. Further, in the control configuration illustrated in FIG. 14, for example, the AC switch 24 is disconnected, and when it is not necessary to output power to the AC electric power system 15 side (power conversion is not performed) (standby mode), the standby mode signal is set at 1.

Further, in typical control of the power converter 30, the AC switch 24 is disconnected, and when it is not necessary to output power to the AC electric power system 15 side, the gate block signal is set at 1, and a gate signal that puts all the gates into an OFF state is output. On the other hand, in the control configuration illustrated in FIG. 14 in the present embodiment, for example, the AC switch 24 is disconnected, and when it is not necessary to output power to the AC electric power system 15 side (power conversion is not performed) (standby mode), the gate block signal is set at 0.

By this means, when the power converter 30 in the present embodiment is in the standby mode, the standby mode signal is 1, and the gate block signal is 0. Thus, for example, in the U phase, 0 is output from the AND circuit in step S25*a* and step S25*d* as the gate signals gu1 and gu4. On the other hand, 1 is output from the AND circuit in step S25*b* and step S25*c* as the gate signals gu3 and gu2.

In other words, in a case where the standby mode signal is 1, 0 is output from the AND circuit in step S24*a* and step S24*d* regardless of a signal on the other side, and thus, 0 is output from the AND circuit in step S25*a* and step S25*d* as the gate signals gu1 and gu4. On the other hand, in a case where the standby mode signal is 1, 1 is output from the OR circuit in step S24*b* and step S24*c* regardless of a signal on the other side, and thus, 1 is output from the AND circuit in step S25*b* and step S25*c* as the gate signals gu3 and gu2.

By this means, in a case where the power converter 30 is in the standby mode, the standby mode signal is 1, and thus, the semiconductor elements 1 and 4 of each phase are always in an OFF state, and the semiconductor elements (neutral point elements) 2 and 3 of each phase are always in an ON state. Note that in a case where the standby mode signal is 0 (power generation mode), the gate block signal is also 0, and a value that is the same as the value output from the dead time generator is output as the gate signals gu1, gu3, gu2 and gu4.

Operational Effects of First Embodiment

According to the first embodiment illustrated from FIG. 1 to FIG. 14 described above, in a case where the power converter 30 is in the standby mode, a gate signal that puts the semiconductor elements (neutral point elements) 2 and 3 of each phase into an ON state is provided. Thus, according to the present embodiment, in a case where the power converter 30 is in the standby mode, even in a case where the potentials to ground of the P electrode and the N electrode are charged by a lightning stroke, one or both of the neutral point elements 2 and 3 is put into an ON state. By this means, according to the present embodiment, the semiconductor elements 1 to 4 of the power converter 30 are prevented from breaking down due to an overvoltage by a lightning surge in the multilevel power conversion system 20, so that it is possible to protect the neutral point elements 2 and 3 from breakdown due to an overvoltage by a lightning surge.

Modification of First Embodiment

Figure 15:
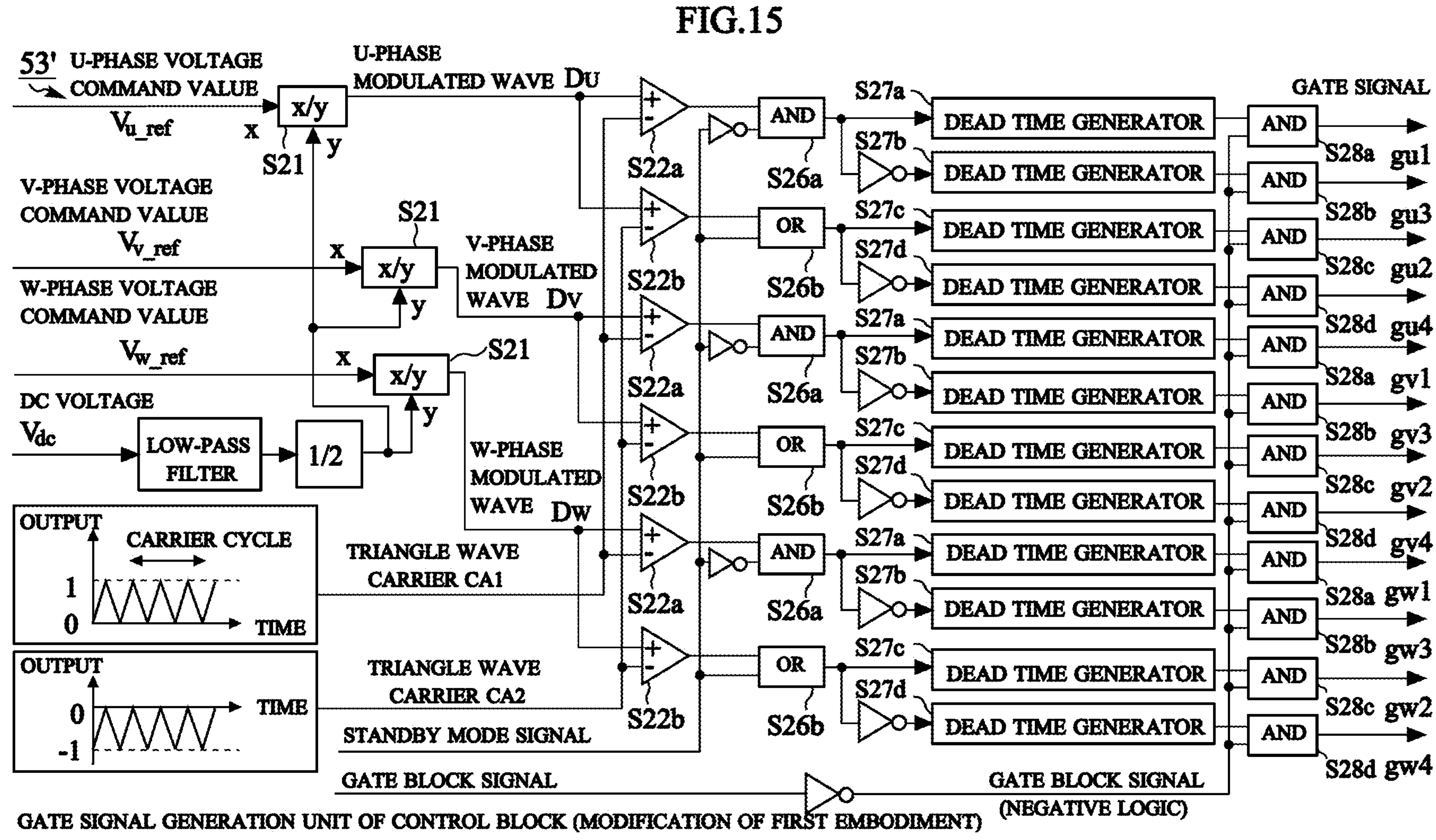
FIG. 15 is a view illustrating one example of a control configuration of a gate signal generation unit of a control unit according to a modification of the first embodiment.

FIG. 15 is a view illustrating one example of a control configuration in a gate signal generation unit 53' of the control unit 50 according to a modification of the first embodiment. In the modification of the first embodiment illustrated in FIG. 15, components or processing that are the same as or similar to those in the first embodiment illustrated from FIG. 1 to FIG. 14 will be denoted by the same reference numerals, and detailed description will be omitted or simplified.

Note that in the modification of the first embodiment, components and control other than a control configuration of the gate signal generation unit 53' illustrated in FIG. 15 are the same as or similar to those in the first embodiment illustrated from FIG. 1 to FIG. 14. In the control illustrated in FIG. 15, processing that is the same as or similar to the processing from step S21 to step S22*b* illustrated in FIG. 14 is performed, and processing from step S26*a* to step S28*d* is performed instead of the processing from step S23*a* to step S25*d*. In the following description, control of the U phase will be described as an example for control common among the respective phases in a similar manner to the description of FIG. 14.

The processing from step S21 to step S22*b* is the same as or similar to the processing illustrated in FIG. 14, and thus, description will be omitted.

In step S26*a*, the gate signal generation unit 53' outputs a logical product (AND) of the value of the signal output in step S22*a* and the value of the negative logic (NOT) of the standby mode signal.

In step S26*b*, the gate signal generation unit 53' outputs a logical sum (OR) of the value of the signal output through the processing in step S22*b* and the value of the standby mode signal.

In step S27*a*, the gate signal generation unit 53' outputs a signal obtained by delaying the value of the signal output through the processing in step S26*a* by the dead time generator.

In step S27*b*, the gate signal generation unit 53' outputs a signal obtained by delaying a value of a negative logic (NOT) of the signal output through the processing in step S26*a* by the dead time generator.

In step S27*c*, the gate signal generation unit 53' outputs a signal obtained by delaying the signal output through the processing in step S26*b* by the dead time generator.

In step S27*d*, the gate signal generation unit 53' outputs a signal obtained by delaying a value of a negative logic (NOT) of the signal output through the processing in step S26*b* by the dead time generator.

From step S28*a* to step S28*d*, the gate signal generation unit 53' acquires a value of the signal output through the processing from step S27*a* to step S27*d* and the value of the negative logic (NOT) of the gate block signal. Then, the gate signal generation unit 53' outputs each of the gate signals gu1, gu3, gu2 and gu4 based on a logical product (AND) of the acquired value of the signal output through the processing from step S27*a* to step S27*d* and the value of the negative logic (NOT) of the gate block signal.

Note that the gate signal generation unit 53' performs processing indicated from step S21 to step S22*b* and from step S26*a* to step S28*d* described above on each of the V phase and the W phase in a similar manner to the U phase and outputs the gate signals gv1 to gv4 and the gate signals gw1 to gw4 that control operation of the semiconductor elements 1 to 4.

As described above, in the processing in the modification of the first embodiment illustrated in FIG. 15, in a similar manner to the processing in the first embodiment illustrated in FIG. 14, in a case where the power converter 30 is in the standby mode, the standby mode signal is 1, and the gate block signal is 0. Thus, for example, in the U phase, 0 is output from the AND circuit in step S28*a* and step S28*d* as the gate signals gu1 and gu4. On the other hand, 1 is output from the AND circuit in step S28*b* and step S28*c* as the gate signals gu3 and gu2.

By this means, in the processing illustrated in FIG. 15, in a similar manner to the processing illustrated in FIG. 14, in a case where the power converter 30 is in the standby mode, the standby mode signal is 1, and thus, the semiconductor elements 1 and 4 of each phase are always in an OFF state, and the semiconductor elements (neutral point elements) 2 and 3 of each phase are always in an ON state. Note that in a case where the standby mode signal is 0 (power generation mode), the gate block signal is also 0, and a value that is the same as the value output from the dead time generator is output from the AND circuit from step S28*a* to step S28*d* as the gate signals gu1, gu3, gu2 and gu4.

Operational Effects of Modification of First Embodiment

As described above, according to the modification of the first embodiment illustrated in FIG. 15, operational effects similar to those in the first embodiment illustrated from FIG. 1 to FIG. 14 are provided. Thus, also by the modification of the present embodiment, the semiconductor elements 1 to 4 of the power converter 30 are prevented from breaking down due to an overvoltage by a lightning surge in the multilevel power conversion system 20, so that it is possible to protect the neutral point elements 2 and 3 from breakdown due to an overvoltage by a lightning surge.

Second Embodiment

FIG. 16 is a view illustrating one example of a control configuration in a gate signal generation unit 53A of a control unit 50A according to a second embodiment. In the second embodiment illustrated in FIG. 16, components or processing that are the same as or similar to those in the first embodiment and the modification of the first embodiment illustrated from FIG. 1 to FIG. 15 will be denoted by the same reference numerals, and detailed description will be omitted or simplified.

Note that in the second embodiment, components and control other than the control configuration of the gate signal generation unit 53A of the control unit 50A illustrated in FIG. 16 are the same as or similar to those in the first embodiment illustrated from FIG. 1 to FIG. 14. In other words, while not illustrated, in the second embodiment, the control unit 50A is provided instead of the control unit 50 in the first embodiment illustrated in FIG. 2. Further, the control unit 50A includes the gate signal generation unit 53A instead of the gate signal generation unit 53 of the control unit 50 in the first embodiment illustrated in FIG. 2. In the following description, control of the U phase will be described as an example for control common among the respective phases in a similar manner to the description of FIG. 14.

The control unit 50A in the second embodiment outputs to the power converter 30, a gate signal generated based on a voltage command value that makes a voltage output to the AC side (AC input/output unit 32 (see FIGS. 3 and 4)) approximately equal to (a voltage that can be regarded as equal to) a voltage of the DC neutral point C during the standby mode. Note that the voltage approximately equal to the voltage of the DC neutral point C can be implemented by a voltage command of 0 (zero) being provided in an output voltage control method that is typically used in a three-level power converter.

In step S31, in the gate signal generation unit 53A, a selector acquires the U-phase voltage command value $V_{u\_ref}$ output from the voltage command generation unit 52, the U-phase voltage command value of 0 (zero), and the standby mode signal. Then, the selector selects one of the U-phase voltage command value $V_{u\_ref}$ and the U-phase voltage command value of 0 (zero) in accordance with whether the standby mode signal acquired by the selector is 0 or 1, and the gate signal generation unit 53A outputs the selected voltage command value.

In other words, as indicated in step S31 in FIG. 16, in a case where the standby mode signal acquired by the selector is 0, the U-phase voltage command value $V_{u\_ref}$ is selected by the selector, and thus, the gate signal generation unit 53A outputs the U-phase voltage command value $V_{u\_ref}$. On the other hand, in a case where the standby mode signal acquired by the selector is 1, the U-phase voltage command value of 0 (zero) is selected by the selector, and thus, the gate signal generation unit 53A outputs the U-phase voltage command value of 0 (zero). Thus, in a case where the power converter 30 is in the standby mode, the standby mode signal is 1, and thus, the voltage command value of 0 (zero) is always selected by the selector, and the voltage command value of 0 (zero) is always output from the selector. Note that the selector (multiplexer) is a circuit that selects and outputs one signal (voltage command value) from a plurality of input signals (voltage command values) in accordance with a value of a control signal (standby mode signal).

In step S32, the gate signal generation unit 53A acquires the U-phase voltage command value $V_{u\_ref}$ or the voltage command value (x) of 0 (zero) output from the selector in the processing in step S31. Further, the gate signal generation unit 53A acquires a value (y) that is the DC voltage $V_{dc}$ halved by applying the low-pass filter to the DC voltage $V_{dc}$ detected by the DC voltage sensor 25. Then, the gate signal generation unit 53 divides the acquired value (x) by the acquired value (y) (x/y) to obtain a U-phase modulated wave $D_u$ and outputs the obtained U-phase modulated wave $D_u$. Here, in a case where the value (x) output from the selector through the processing in step S31 is the voltage command value of 0 (zero), the obtained value (x/y) is always 0, and thus, in this case, 0 is always output as the U-phase modulated wave $D_u$ in the processing in step S32.

In step S33*a*, the gate signal generation unit 53A compares the U-phase modulated wave $D_u$ output through the processing in step S32 with the triangle wave carrier CA1 generated by the carrier generator by the comparator. Then, the gate signal generation unit 53 outputs a signal of 1 in a case where the U-phase modulated wave $D_u$ is greater than the triangle wave carrier CA1 and outputs a signal of 0 in a case where the U-phase modulated wave $D_u$ is smaller than the triangle wave carrier CA1.

Here, in a case where the power converter 30 is in the standby mode, and the standby mode signal is 1, the value (x) output from the selector through the processing in step S31 is always the voltage command value of 0 (zero), and the value of the U-phase modulated wave $D_u$ output through the processing in step S32 is always 0. As described above, the triangle wave carrier CA1 is a triangle wave signal that changes from 0 to 1 in a certain carrier cycle, and thus, in a case where the value of the U-phase modulated wave $D_u$ is 0, the U-phase modulated wave $D_u$ is always smaller than the triangle wave carrier CA1. Thus, in a case where the power converter 30 is in the standby mode, and the standby mode signal is 1, the U-phase modulated wave $D_u$ is always smaller than the triangle wave carrier CA1, and thus, in this case, a signal of 0 is always output from the comparator through the processing in step S33*a*.

In step S33*b*, the gate signal generation unit 53A compares the U-phase modulated wave $D_u$ output through the processing in step S32 with the triangle wave carrier CA2 generated by the carrier generator by the comparator. Then, the gate signal generation unit 53 outputs a signal of 1 in a case where the U-phase modulated wave $D_u$ is greater than the triangle wave carrier CA2 and outputs a signal of 0 in a case where the U-phase modulated wave $D_u$ is smaller than the triangle wave carrier CA2.

Here, in a case where the power converter 30 is in the standby mode, and the standby mode signal is 1, as described above, the value of the U-phase modulated wave $D_u$ output through the processing in step S32 is also always 0. As described above, the triangle wave carrier CA2 is a triangle wave signal that changes from −1 to 0 in a certain carrier cycle, and thus, in a case where a value of the U-phase modulated wave $D_u$ is 0, the U-phase modulated wave $D_u$ is always greater than the triangle wave carrier CA1. Thus, in a case where the power converter 30 is in the standby mode, and the standby mode signal is 1, the U-phase modulated wave $D_u$ is always greater than the triangle wave carrier CA2, and thus, in this case, a signal of 1 is always output from the comparator through the processing in step S33*b*.

Processing from step S34*a* to step S35*d* is the same as or similar to the processing from step S27*a* to step S28*d* illustrated in FIG. 15, and thus, description will be omitted.

As described above, in the processing in the second embodiment illustrated in FIG. 16, in a case where the power converter 30 is in the standby mode, the standby mode signal is 1, and the gate block signal is 0 in a similar manner to the processing in the first embodiment and the modification of the first embodiment illustrated in FIG. 14 and FIG. 15. Thus, for example, in the U phase, 0 is output from the AND circuit in step S35*a* and step S35*d* as the gate signals gu1 and gu4. On the other hand, 1 is output from the AND circuit in step S35*b* and step S35*c* as the gate signals gu3 and gu2.

By this means, in the processing illustrated in FIG. 16, in a case where the power converter 30 is in the standby mode, the standby mode signal is 1, and thus, the semiconductor elements 1 and 4 of each phase are always in an OFF state, and the semiconductor elements (neutral point elements) 2 and 3 of each phase are always in an ON state in a similar manner to the processing illustrated in FIG. 14 and FIG. 15. Note that in a case where the standby mode signal is 0 (power generation mode), the gate block signal is also 0, and a value that is the same as the value output from the dead time generator is output from the AND circuit from step S35*a* to step S35*d* as the gate signals gu1, gu3, gu2 and gu4.

Operational Effects of Second Embodiment

As described above, according to the second embodiment illustrated in FIG. 16, operational effects similar to those of the first embodiment and the modification of the first embodiment illustrated from FIG. 1 to FIG. 15 are provided.

In other words, according to the second embodiment illustrated in FIG. 16, in a case where the power converter 30 is in the standby mode, the voltage command of 0 (zero) is provided, and the gate signals gu3 and gu2 generated based on the voltage command value that makes a voltage output to the AC side approximately equal to the voltage of the DC neutral point C are output. Also by this means, the semiconductor elements 1 to 4 of the power converter 30 are prevented from breaking down due to an overvoltage by a lightning surge, so that it is possible to protect the neutral point elements 2 and 3 from breakdown due to an overvoltage by a lightning surge.

Third Embodiment

Figure 17:
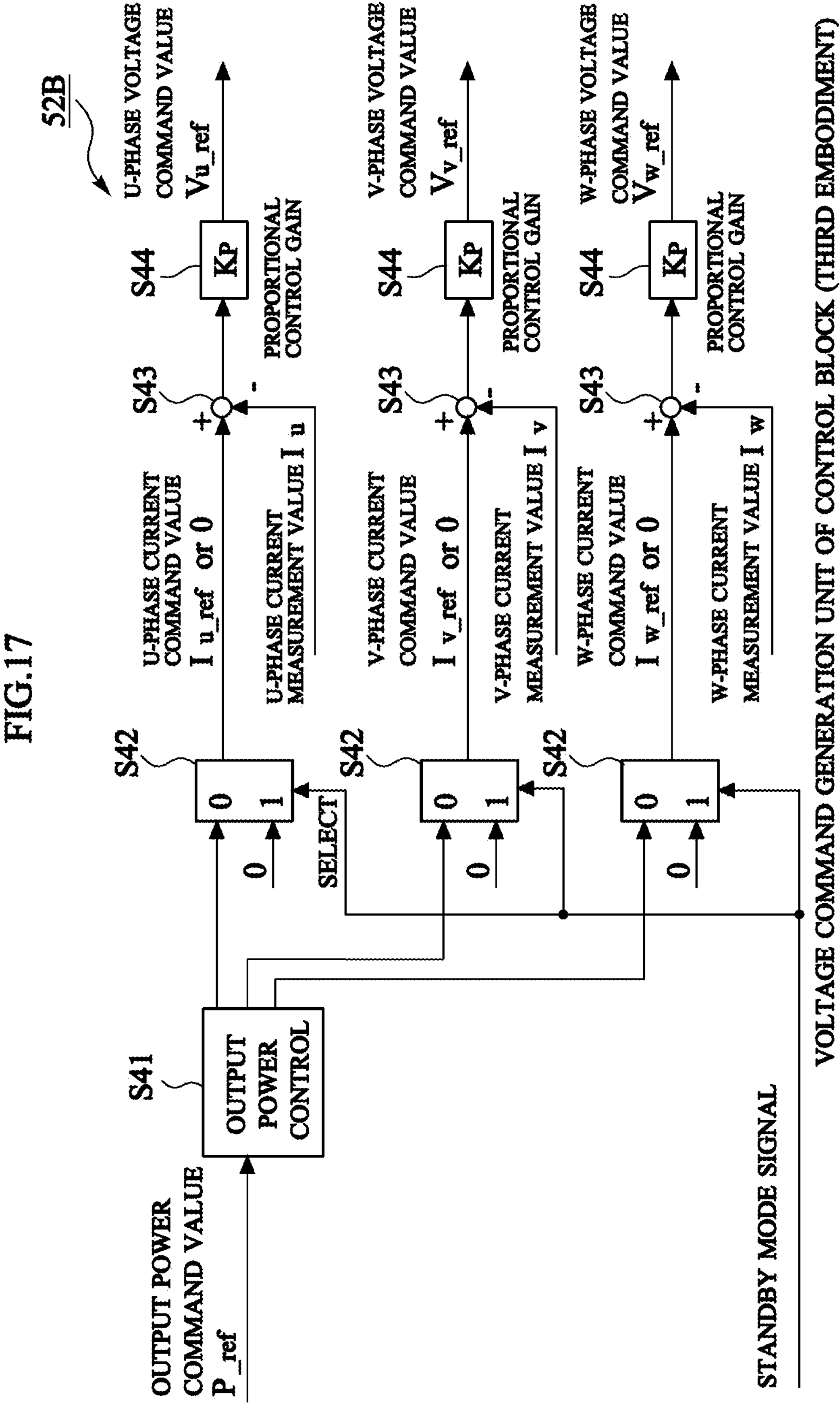
FIG. 17 is a view illustrating one example of a control configuration of a voltage command generation unit of a control unit according to a third embodiment.

FIG. 17 is a view illustrating one example of a control configuration in a voltage command generation unit 52B of a control unit 50B according to a third embodiment. In the third embodiment illustrated in FIG. 17 and FIG. 18 which will be described later, components or processing that are the same as or similar to those from the first embodiment to the second embodiment illustrated from FIG. 1 to FIG. 16 will be denoted by the same reference numerals, and detailed description will be omitted or simplified.

Note that in the third embodiment, components and control other than the control configuration of the voltage command generation unit 52B of the control unit 50B illustrated in FIG. 17 and a gate signal generation unit 53B of the control unit 50B illustrated in FIG. 18 which will be described later are the same as or similar to those in the first embodiment illustrated from FIG. 1 to FIG. 14. In other words, while not illustrated, in the third embodiment, the control unit 50B is provided instead of the control unit 50 in the first embodiment illustrated in FIG. 2. Further, the control unit 50B includes the voltage command generation unit 52B instead of the voltage command generation unit 52 of the control unit 50 in the first embodiment illustrated in FIG. 2 and includes the gate signal generation unit 53B instead of the gate signal generation unit 53. In the following description, control of the U phase will be described as an example for control common among the respective phases in a similar manner to the description of FIG. 13.

In step S41, the voltage command generation unit 52B acquires the predetermined output power command value $P_{\_ref}$ and outputs the U-phase current command value $I_{u\_ref}$ based on the acquired output power command value $P_{\_ref}$.

In step S42, in the voltage command generation unit 52B, a selector acquires the U-phase current command value $I_{u\_ref}$ output through the processing in step S41, the U-phase current command value of 0 (zero), and the standby mode signal. Then, the selector selects one of the U-phase current command value $I_{u\_ref}$ and the U-phase current command value of 0 (zero) in accordance with whether the standby mode signal acquired by the selector is 0 or 1, and the voltage command generation unit 52B outputs the selected current command value.

In other words, as indicated in step S42 in FIG. 17, in a case where the standby mode signal acquired by the selector is 0, the U-phase current command value $I_{u\_ref}$ is selected by the selector, and thus, the voltage command generation unit 52B outputs the U-phase current command value $I_{u\_ref}$. On the other hand, in a case where the standby mode signal acquired by the selector is 1, the U-phase current command value of 0 (zero) is selected by the selector, and thus, the voltage command generation unit 52B outputs the U-phase current command value of 0 (zero). Thus, in a case where the power converter 30 is in the standby mode, the standby mode signal is 1, and thus, the current command value of 0 (zero) is always selected by the selector, and the current command value of 0 (zero) is always output from the selector.

In step S43, the voltage command generation unit 52B acquires the U-phase current command value $I_{u\_ref}$ or the U-phase current command value of 0 (zero) output through the processing in step S42. Further, the voltage command generation unit 52B acquires the U-phase AC current $I_u$ (U-phase current measurement value $I_u$) detected by the AC current sensor (see FIG. 1), for example, via the acquisition unit 41 (see FIG. 2). Then, the voltage command generation unit 52B subtracts the acquired U-phase current measurement value $I_u$ from the acquired U-phase current command value $I_{u\_ref}$ or U-phase current command value of 0 (zero) and outputs a value after the subtraction.

In step S44, the voltage command generation unit 52B performs proportional control based on the value output through the processing in step S43 and the proportional control gain Kp and outputs the U-phase voltage command value $V_{u\_ref}$ obtained through the proportional control to the gate signal generation unit 53B (see FIG. 18).

Note that the voltage command generation unit 52B obtains the V-phase voltage command value Vv_ref and the W-phase voltage command value Vw_ref in a similar manner to the U phase from step S41 to step S44 and outputs the obtained V-phase voltage command value Vv_ref and W-phase voltage command value Vw_ref to the gate signal generation unit 53B.

FIG. 18 is a view illustrating one example of a control configuration in the gate signal generation unit 53B of the control unit 50B according to the third embodiment. In the following description, control of the U phase will be described as an example for control common among the respective phases in a similar manner to the description of FIG. 14.

Processing from step S51 to step S53*d* is the same as or similar to the processing from step S21 to step S23*d* illustrated in FIG. 14, and thus, description will be omitted.

From step S54*a* to step S54*d*, the gate signal generation unit 53B acquires a value of the signal output through the processing from step S53*a* to step S53*d* and the value of the negative logic (NOT) of the gate block signal. Then, the gate signal generation unit 53B outputs the gate signals gu1, gu3, gu2 and gu4 based on a logical product (AND) of the acquired value of the signal output through the processing from step S53*a* to step S53*d* and the value of the negative logic (NOT) of the gate block signal.

Note that the gate signal generation unit 53 performs the processing indicated from step S51 to step S55*d* described above on each of the V phase and the W phase in a similar manner to the U phase and outputs gate signals gv1 to gv4 and gate signals gw1 to gw4 that control operation of the semiconductor elements 1 to 4.

Note that processing to be performed at the gate signal generation unit 53B illustrated in FIG. 18 is similar to the processing to be typically performed in control of a normal power converter except that the gate block signal is 0 also during the standby mode.

As described above, in the processing illustrated in FIG. 17 and FIG. 18, during the standby mode, a gate signal generated based on a voltage command value that makes an output current of each phase on the AC side (AC input/output unit 32 (see FIGS. 3 and 4)) of the power converter 30 approximately 0 (a value that can be regarded as 0) is output to the power converter 30. Note that the voltage command value that makes the output current of each phase on the AC side of the power converter 30 approximately 0 can be implemented by a voltage command of 0 (zero) being provided in an output current control method that is typically used in a three-level power converter. In other words, to make a current 0 in a state where the AC switch 24 is in an OFF (disconnected) state, it is only necessary to make the voltage 0. In other words, to maintain the current at 0, the voltage command value itself is made approximately 0, and the voltage is made 0.

In the processing illustrated in FIG. 17, in a case where the standby mode signal is 1, the U-phase current command value output through the processing in step S42 is 0 (zero), and eventually, the value of the U-phase current measurement value $I_u$ to be subtracted in the processing in step S43 converges to approximately 0. As a result, a value of the voltage command value $V_{u\_ref}$ output through the processing in step S44 also converges to approximately 0. By this means, the gate signal generation unit 53B illustrated in FIG. 18 outputs a gate signal generated based on a voltage command value that makes an output current of each phase on the AC side of the power converter 30 approximately 0 during the standby mode to the power converter 30.

As described above, in the processing of the third embodiment illustrated in FIG. 17 and FIG. 18, in a case where the power converter 30 is in the standby mode, the standby mode signal is 1, and the gate block signal is 0 in a similar manner to the processing from the first embodiment to the second embodiment illustrated from FIG. 13 to FIG. 16. Thus, for example, in the U phase, 0 is output from the AND circuit in step S54*a* and step S54*d* as the gate signals gu1 and gu4. On the other hand, 1 is output from the AND circuit in step S54*b* and step S54*c* as the gate signals gu3 and gu2. Note that in a case where the standby mode signal is 0 (power generation mode), the gate block signal is also 0, and a value that is the same as the value output from the dead time generator is output from the AND circuit from step S54*a* to step S54*d* as the gate signals gu1, gu3, gu2 and gu4.

Operational Effects of Third Embodiment

As described above, according to the third embodiment illustrated in FIG. 17 and FIG. 18, operational effects similar to those from the first embodiment to the second embodiment illustrated from FIG. 1 to FIG. 16 are provided. In other words, according to the third embodiment illustrated in FIG. 17 and FIG. 18, during the standby mode, the gate signals gu3 and gu2 generated based on the voltage command value that makes the output current of each phase on the AC side of the power converter 30 0 are output by the voltage command of 0 (zero) being provided. Also by this means, the semiconductor elements 1 to 4 of the power converter 30 are prevented from breaking down due to an overvoltage by a lightning surge, so that it is possible to protect the neutral point elements 2 and 3 from breakdown due to an overvoltage by a lightning surge.

Note that in the second embodiment illustrated in FIG. 16, the gate signals gu3 and gu2 generated based on the voltage command value that makes a voltage output to the AC side equal to the voltage of the DC neutral point C are output by directly making the voltage command value itself 0. On the other hand, in the third embodiment illustrated in FIG. 17 and FIG. 18, the voltage command value is made 0 by making the current command value 0 without directly changing the voltage command value itself, thereby, eventually, effects similar to those in the second embodiment illustrated in FIG. 16 are provided.

Fourth Embodiment

Figure 19:
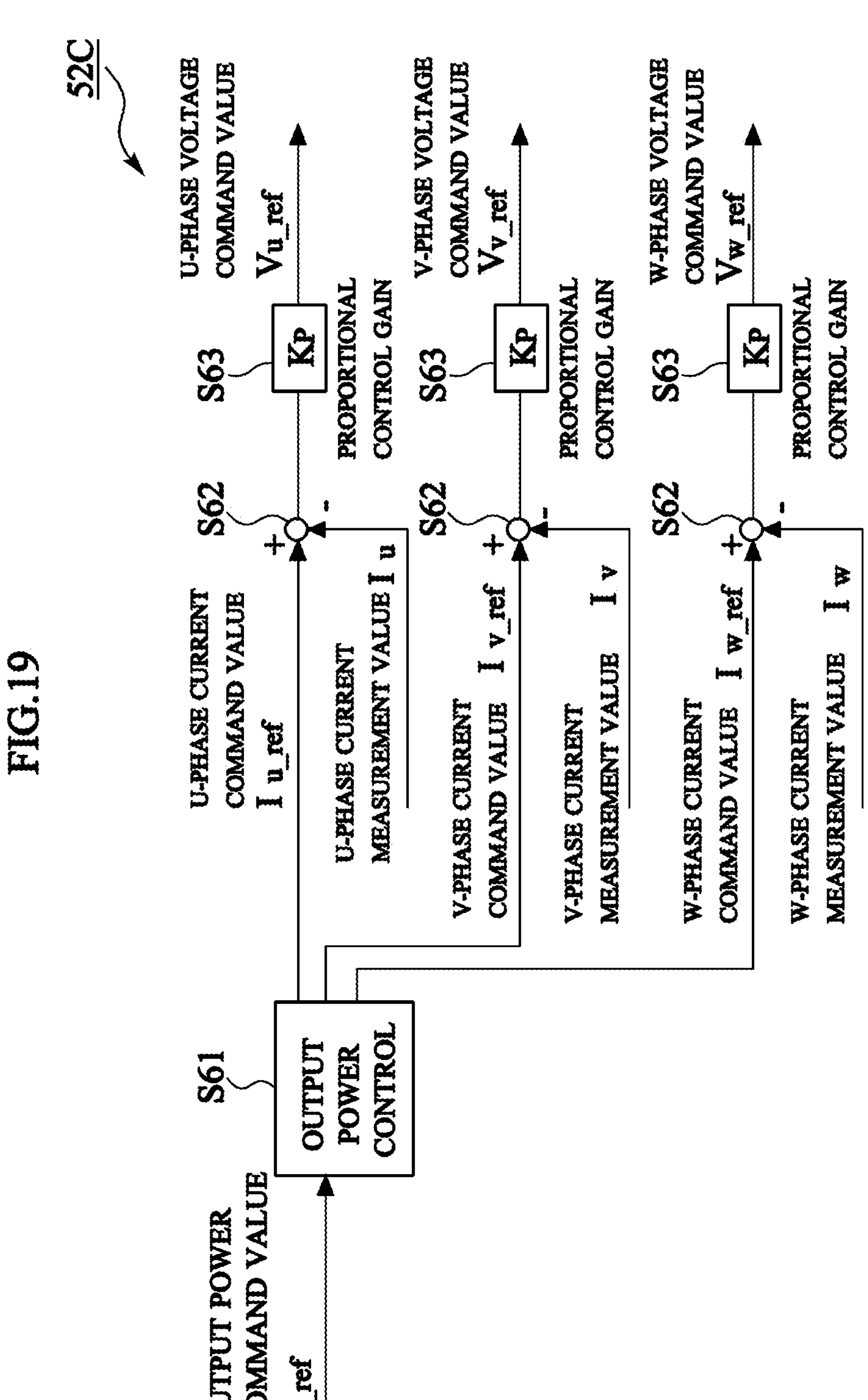
FIG. 19 is a view illustrating one example of a control configuration of a voltage command generation unit of a control unit according to a fourth embodiment.

FIG. 19 is a view illustrating one example of a control configuration in a voltage command generation unit 52C of a control unit 50C according to a fourth embodiment. In the fourth embodiment illustrated in FIG. 19 and FIG. 20 which will be described later, components or processing that are the same as or similar to those from the first embodiment to the third embodiment illustrated from FIG. 1 to FIG. 18 will be denoted by the same reference numerals, and detailed description will be omitted or simplified.

Note that in the fourth embodiment, components and control other than the control configuration of the voltage command generation unit 52C of the control unit 50C illustrated in FIG. 19 and a gate signal generation unit 53C of the control unit 50C illustrated in FIG. 20 which will be described later are the same as or similar to those in the first embodiment illustrated from FIG. 1 to FIG. 14. In other words, while not illustrated, in the fourth embodiment, the control unit 50C is provided instead of the control unit 50 in the first embodiment illustrated in FIG. 2. Further, the control unit 50C includes the voltage command generation unit 52C instead of the voltage command generation unit 52 of the control unit 50 in the first embodiment illustrated in FIG. 2 and includes the gate signal generation unit 53C instead of the gate signal generation unit 53. In the following description, control of the U phase will be described as an example for control common among the respective phases in a similar manner to the description of FIG. 13.

Processing from step S61 to step S63 is the same as or similar to the processing from step S11 to step S13 illustrated in FIG. 13, and thus, description will be omitted. In other words, the processing to be performed in the voltage command generation unit 52C illustrated in FIG. 19 is similar to processing to be typically performed in control of a normal power converter in a similar manner to the processing to be performed in the voltage command generation unit 52 described in FIG. 13.

Figure 20:
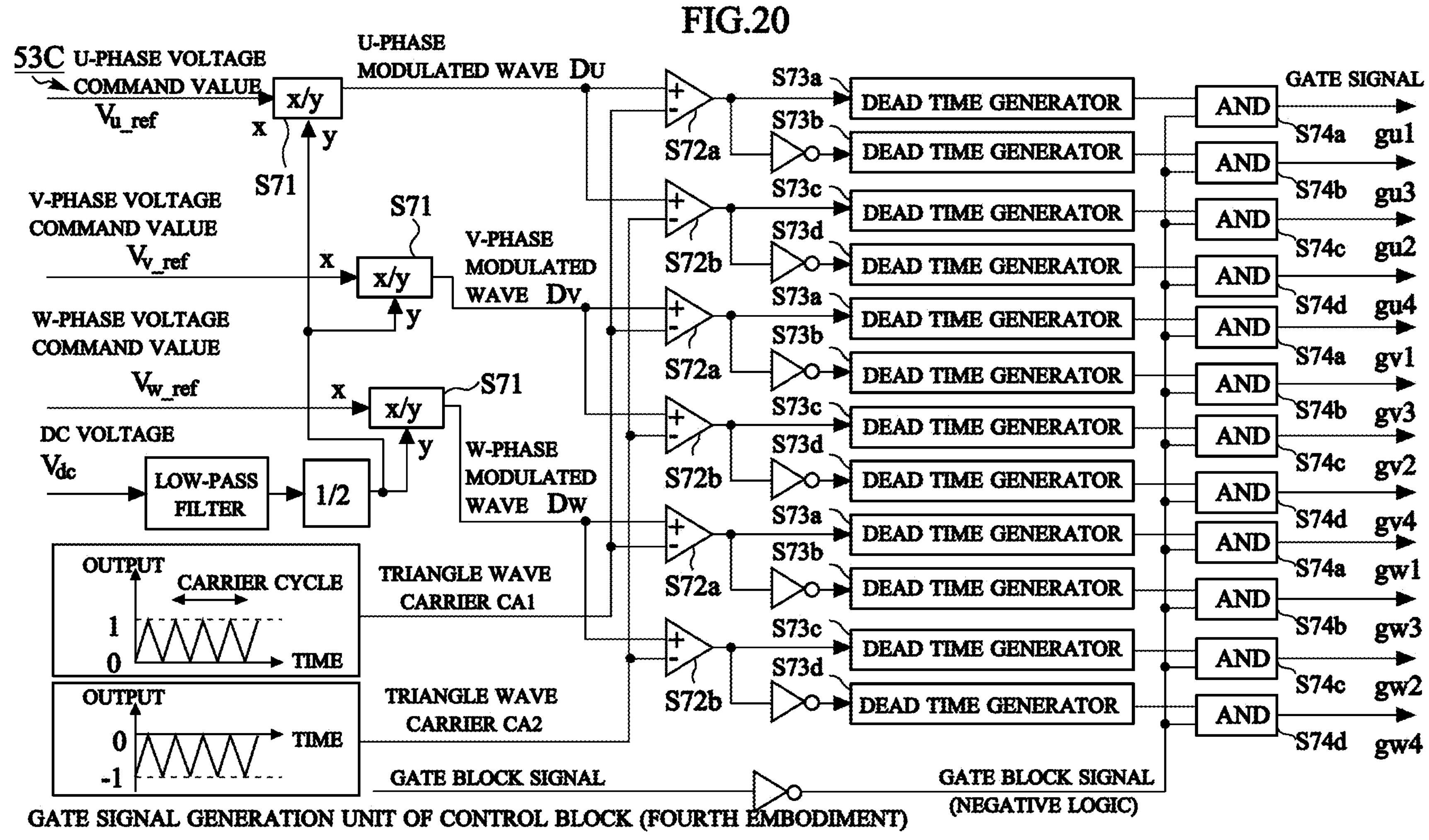
FIG. 20 is a view illustrating one example of a control configuration of a gate signal generation unit of the control unit according to the fourth embodiment.

FIG. 20 is a view illustrating one example of the control configuration of the gate signal generation unit 53C of the control unit 50C according to the fourth embodiment. In the following description, control of the U phase will be described as an example for control common among the respective phases in a similar manner to the description of FIG. 14.

Processing from step S71 to step S74*d* is the same as or similar to the processing from step S51 to step S54*d* illustrated in FIG. 18, and thus, description will be omitted. In other words, the processing to be performed in the gate signal generation unit 53C illustrated in FIG. 20 is similar to processing to be typically performed in control of a normal power converter except that the gate block signal is 0 also during the standby mode in a similar manner to the processing to be performed in the gate signal generation unit 53B described in FIG. 18.

As described above, in the processing of the fourth embodiment illustrated in FIG. 19 and FIG. 20, a typical control method is performed. However, normally, in a case where it is not necessary to operate the power converter, the controller stops all the gate signals in a case where the AC switch 24 is disconnected or in the standby mode. On the other hand, in the processing of the fourth embodiment illustrated in FIG. 19 and FIG. 20, the controller 40 outputs a gate signal generated based on an arbitrary voltage command value or an arbitrary current command value to the power converter 30 in a similar manner to during an operating state also in a case where the AC switch 24 is disconnected or in the standby mode (standby state).

Operational Effects of Fourth Embodiment

According to the fourth embodiment illustrated in FIG. 19 and FIG. 20, operational effects similar to those from the first embodiment to the third embodiment illustrated from FIG. 1 to FIG. 18 are provided. In other words, also according to the fourth embodiment illustrated in FIG. 19 and FIG. 20, the semiconductor elements 1 to 4 of the power converter 30 are prevented from breaking down due to an overvoltage by a lightning surge, so that it is possible to protect the neutral point elements 2 and 3 from breakdown due to an overvoltage by a lightning surge.

In other words, in a typical control method, even in a case where the AC switch 24 is disconnected or in the standby mode (standby state), if the power converter 30 is driven in accordance with some kind of voltage command value (current command value), one or both of the neutral point elements 2 and 3 are in an ON state. Thus, in the fourth embodiment illustrated in FIG. 19 and FIG. 20, the power converter 30 is driven in a similar manner to during the operating state even in a case where the AC switch 24 is disconnected or in the standby mode (standby state). By this means, also according to the fourth embodiment illustrated in FIG. 19 and FIG. 20, operational effects similar to those from the first embodiment to the third embodiment illustrated from FIG. 1 to FIG. 18 can be provided.

Note that in the fourth embodiment illustrated in FIG. 19 and FIG. 20, a state where the gate signal is output to the power converter 30 while the AC switch 24 is disconnected, that is, in the standby state, is a state where so-called voltage regulation operation is performed. In this case, ON and OFF of the neutral point elements 2 and 3 are repeated, and thus, power consumption for driving the gate increases compared to a case where ON and OFF of the neutral point elements 2 and 3 are not performed. Further, in a case where the AC capacitor 23 (see FIG. 1) is provided on the AC side, an extra current flows through the AC capacitor, which makes a life of the AC capacitor 23 shorter than that in a case where a current does not flow through the AC capacitor 23.

On the other hand, according to the second embodiment and the third embodiment illustrated from FIG. 16 to FIG. 18, the voltage command value of 0 (zero) or a voltage command value close to 0 (zero) is output, and thus, the neutral point elements 2 and 3 are always in an ON state, and the other semiconductor elements 1 and 4 are always in an OFF state although depending on the control method. In this case, ON and OFF of the neutral point elements 2 and 3 are not repeated, and thus, power consumption for driving the gate is smaller than that in a case where ON and OFF of the neutral point elements 2 and 3 are repeated. Further, in a case where the AC capacitor 23 (see FIG. 1) is provided on the AC side, a current does not flow through the AC capacitor 23, and thus, a life of the AC capacitor 23 becomes longer than that in a case where a voltage that causes a current to flow through the AC capacitor 23 is applied. If the voltage command value becomes a value other than 0 (zero) due to noise, or the like, in measurement of a current, and a current flows as a result of the neutral point elements being put into an ON state or an OFF state, the current that flows is less, and thus, a life of the AC capacitor 23 becomes relatively long.

Thus, in terms of power consumption and the life of the AC capacitor 23, the second embodiment and the third embodiment illustrated from FIG. 16 to FIG. 18 which require smaller power consumption and which make the life of the AC capacitor 23 longer seem to be more preferable than the fourth embodiment illustrated in FIG. 19 and FIG. 20. However, in terms of protection of the semiconductor elements 1 to 4 (neutral point elements 2 and 3) from breakdown due to an overvoltage by a lightning surge, the fourth embodiment illustrated in FIG. 19 and FIG. 20 provides operational effects similar to those in the second embodiment and the third embodiment illustrated from FIG. 16 to FIG. 18.

Hardware Configuration Example

Figure 21:
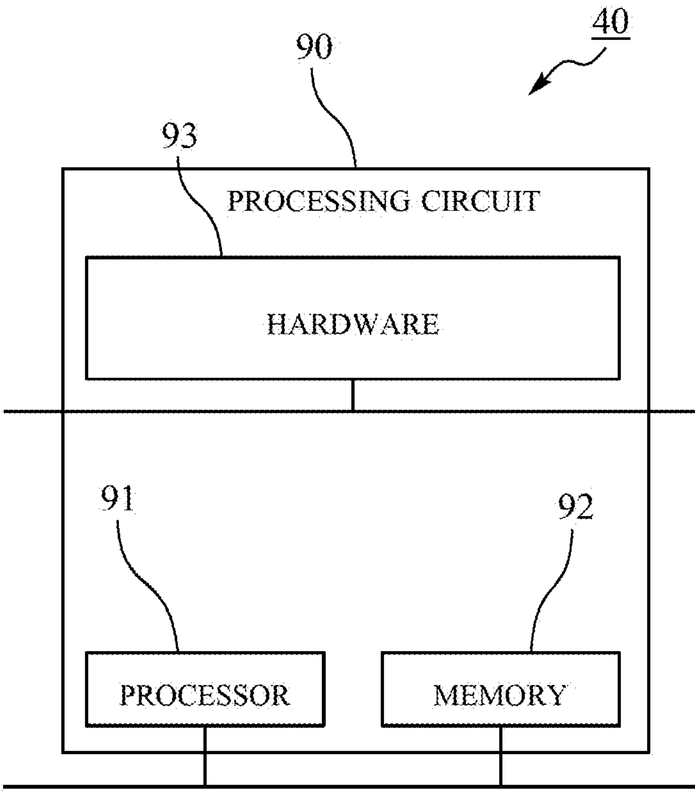
FIG. 21 is a conceptual diagram illustrating a hardware configuration example of a processing circuit of a controller in the embodiments illustrated from FIG. 1 to FIG. 20.

FIG. 21 is a conceptual diagram illustrating a hardware configuration example of a processing circuit 90 of the controller 40 in the embodiments illustrated from FIG. 1 to FIG. 20. The respective functions described above are implemented by the processing circuit 90. As one aspect, the processing circuit 90 includes at least one processor 91 and at least one memory 92. As another aspect, the processing circuit 90 includes at least one piece of dedicated hardware 93.

In a case where the processing circuit 90 includes the processor 91 and the memory 92, the respective functions are implemented by software, firmware or a combination of software and firmware. At least one of software or firmware is described as a program. At least one of software or firmware is stored in the memory 92. The processor 91 implements the respective functions by reading out and executing the program stored in the memory 92.

In a case where the processing circuit 90 includes the dedicated hardware 93, the processing circuit 90 is, for example, a single circuit, a composite circuit, a programmed processor or a combination thereof. The respective functions are implemented by the processing circuit 90.

Part or all of the respective functions of the controller 40 may be constituted of hardware or may be constituted as a program to be executed by the processor. In other words, the controller 40 can be implemented by a computer and a program, and the program can be stored in a storage medium or can be provided through a network.

Supplementary Note of Embodiments

According to the embodiments illustrated from FIG. 1 to FIG. 21 described above, the present disclosure is divided into the first embodiment and the modification thereof illustrated from FIG. 1 to FIG. 15, the second embodiment illustrated in FIG. 16, the third embodiment illustrated in FIG. 17 and FIG. 18, and the fourth embodiment illustrated in FIG. 19 and FIG. 20. However, any plurality of these embodiments may be combined in series or in parallel. The combined embodiments can also provide operational effects similar to the operational effects provided by the embodiments before being combined.

Note that in the embodiments illustrated from FIG. 1 to FIG. 21, in the flowchart indicated in FIG. 12, the control unit 50 performs determination as to sunrise and sunset based on the DC voltage $V_{dc}$ and causes the operation mode of the power converter 30 to transition. However, the present disclosure is not limited to this, and the control unit 50 may cause the operation mode of the power converter 30 to transition based on a value of the DC current, a period, a time point, or the like, instead of the DC voltage $V_{dc}$. In this case, while not illustrated, the power conversion system 20 may include a DC current sensor, a timer, a clock, or the like. In this case, the control unit 50 may cause the operation mode of the power converter 30 to transition based on the value of the DC current, the period, the time point, or the like, acquired from the DC current sensor, the timer, the clock, or the like, in step S2 and step S5. Also by this means, operational effects similar to those in the embodiments illustrated from FIG. 1 to FIG. 21 are provided.

Further, in the embodiments illustrated from FIG. 1 to FIG. 21, in a case where the operation mode of the power converter 30 is the standby mode, the control units 50 to 50C provide a gate signal that puts one or both of the neutral point elements 2 and 3 connected in series into an ON state. Further, in a case where the operation mode of the power converter 30 is the standby mode, the control units 50 to 50C provide a gate signal that puts the semiconductor elements 1 and 4 other than the neutral point elements 2 and 3 into an OFF state. However, the present disclosure is not limited to this, and the control units 50 to 50C may provide the gate signal as described above in a case where it is determined that the AC switch 24 is in an OFF (disconnected) state regardless of whether the operation mode of the power converter 30 is the standby mode or the power generation mode. Also by this means, operational effects similar to those in the embodiments illustrated from FIG. 1 to FIG. 21 are provided.

Further, description has been provided in the embodiments illustrated from FIG. 1 to FIG. 21 using an example of a case where a connection destination of the AC side (AC input/output unit 32 (see FIGS. 3 and 4)) of the power converter 30 is the AC electric power system 15. However, the present disclosure is not limited to this, and the connection destination of the AC side of the power converter 30 may be an electric motor, a generator, or an AC load. Also by this means, operational effects similar to those in the embodiments illustrated from FIG. 1 to FIG. 21 are provided.

Further, according to the embodiments illustrated from FIG. 1 to FIG. 21, as described above, the semiconductor elements 1 to 4 of the power converter 30 are prevented from breaking down due to an overvoltage by a lightning surge, so that it is possible to protect the neutral point elements 2 and 3 from breakdown due to an overvoltage by a lightning surge. However, a case where the operational effects are provided is not limited to upon a lightning surge. According to the embodiments illustrated from FIG. 1 to FIG. 21, similar operational effects are provided also in a case where the potential to ground on the DC side or the AC side of the power converter 30 largely fluctuates due to, for example, a switching surge, an accident in another peripheral circuit, or the like, other than a lightning surge. Thus, the present disclosure can be also applied to a case such as a switching surge, an accident in another peripheral circuit, or the like, other than a lightning surge.

Further, according to the embodiments illustrated from FIG. 1 to FIG. 21, while description has been provided using an example of the power conversion system 20 and the controller 40 (control units 50 to 50C) of the power conversion system 20 as one aspect of the present disclosure, the present disclosure is not limited to this. The present disclosure can be implemented as a control method in which processing step in the respective units of the controller 40 (control units 50 to 50C) is performed.

Further, the present disclosure can be implemented as a control program causing a computer to execute processing step in the respective units of the controller 40 (control units 50 to 50C).

Further, the present disclosure can be implemented as a storage medium (non-temporary computer-readable storage medium) in which the control program is stored. The control program can be stored in, for example, a removable medium such as a compact disc (CD), a digital versatile disc (DVD), and a universal serial bus (USB) memory and distributed. Note that the control program may be uploaded on a network via a network interface (not illustrated), or the like, of the controller 40 or may be downloaded from the network and stored in the storage unit 43, the memory 92, or the like.

Features and advantages of the embodiments will be clear from the above detailed description. This is intended that the scope of the claims covers the features and the advantages of the embodiments as described above within a range not deviating from the spirit and scope of right. Further, a person having ordinary knowledge in the technical field can easily conceive of every modification and change. Thus, the scope of the embodiments having inventiveness is not intended to be limited to that described above and can include appropriate modifications and equivalents included in the scope disclosed in the embodiments.

REFERENCE SIGNS LIST

1 . . . Power semiconductor element (first semiconductor switching element, semiconductor switching element, semiconductor element, element); 2 . . . Power semiconductor element (second semiconductor switching element, neutral point element, semiconductor switching element, semiconductor element, element); 3 . . . Power semiconductor element (third semiconductor switching element, neutral point element, semiconductor switching element, semiconductor element, element); 4 . . . Power semiconductor element (fourth semiconductor switching element, semiconductor switching element, semiconductor element, element); 11 . . . Photovoltaics (DC power supply); 12 . . . DC cable 13 AC cable; 14 . . . Transformer; 15 . . . AC electric power system (electric power system); 20 . . . Multilevel power conversion system (power conversion system); 21 . . . DC switch; 22 . . . AC reactor; 23 . . . AC capacitor; 24 . . . AC switch; 25 . . . DC voltage sensor; 26 . . . AC current sensor; 30 . . . Multilevel power converter (power converter); 31 . . . DC input/output unit; 32 . . . AC input/output unit; 33 . . . Heatsink; 40 . . . Controller; 41 . . . Acquisition unit; 42 . . . Output unit; 43 . . . Storage unit; 45 . . . System bus (bus); 50, 50A, 50B, 50C . . . Control unit; 51 . . . Operation control unit; 52, 52B, 52C . . . Voltage command generation unit; 53, 53', 53A, 53B, 53C . . . Gate signal generation unit; 90 . . . Processing circuit; 91 . . . Processor; 92 . . . Memory; 93 . . . Hardware; 101 . . . Semiconductor switching element; 102 . . . Semiconductor switching element (neutral point element); 103 . . . Semiconductor switching element (neutral point element); 104 . . . Semiconductor switching element; 130 . . . Multilevel power converter (power converter); 201 . . . Semiconductor switching element; 202 . . . Semiconductor switching element (neutral point element); 203 . . . Semiconductor switching element (neutral point element); 204 . . . Semiconductor switching element; 230 . . . Multilevel power converter (power converter); 301 . . . Semiconductor switching element; 302 . . . Semiconductor switching element (neutral point element); 303 . . . Semiconductor switching element (neutral point element); 304 . . . Semiconductor switching element; 330 . . . Multilevel power converter (power converter); A . . . Power semiconductor module; AC . . . AC terminal (AC terminal); B . . . Power semiconductor module; C . . . DC neutral point; $C_1$ to $C_4$ . . . Parasitic capacitance; CA1, CA2 . . . Triangle wave carrier; CAC, CNC . . . Parasitic capacitance; $C_N$, $C_P$ . . . DC capacitor; D . . . Modulated wave; D1 to D4 . . . Freewheeling diode (inverse parallel diode, diode); $D_u$ . . . U-phase modulated wave; $D_v$ . . . V-phase modulated wave; $D_w$ . . . W-phase modulated wave; GND . . . Ground potential; g, gu1 to gu4, gv1 to gv4, gw1 to gw4 . . . Gate signal; $I_u$ . . . AC current value (AC current, current, U-phase current measurement value); $I_v$ . . . AC current value (AC current, current, V-phase current measurement value); $I_w$ . . . AC current value (AC current, current, W-phase current measurement value); $I_{u\_ref}$ . . . U-phase current command value (current command value); $I_{v\_ref}$ . . . V-phase current command value (current command value); $I_{w\_ref}$ . . . W-phase current command value (current command value); Kp . . . Proportional control gain; N . . . Negative terminal (N electrode terminal); NC . . . No connection terminal (NC terminal); P . . . Positive terminal (P electrode terminal); $P_{\_ref}$ . . . Output power command value; $V_{\_ref}$ . . . Voltage command value; V2, V3 . . . Voltage; $V_{dc}$ . . . DC voltage value (DC voltage, voltage); $V_{LS}$ . . . Charge voltage; $V_{NC}$ . . . Voltage; $V_{u\_ref}$ . . . U-phase voltage command value (voltage command value); $V_{v\_ref}$ . . . V-phase voltage command value (voltage command value); $V_{w\_ref}$ . . . W-phase voltage command value (voltage command value)

The invention claimed is:

1. A multilevel power conversion system comprising:

a multilevel power converter that comprises:

a positive terminal and a negative terminal connected to a DC power supply or a DC load;

a plurality of DC capacitors connected in series via a DC neutral point between the positive terminal and the negative terminal;

an AC terminal connected to an AC power supply or an AC load;

a first semiconductor switching element and a fourth semiconductor switching element connected in series via the AC terminal between the positive terminal and the negative terminal to have the same polarity;

a first freewheeling diode and a fourth freewheeling diode respectively connected in inverse parallel to the first semiconductor switching element and the fourth semiconductor switching element;

a third semiconductor switching element and a second semiconductor switching element connected in series between the DC neutral point and the AC terminal to have reverse polarity; and a third freewheeling diode and a second freewheeling diode respectively connected in inverse parallel to the third semiconductor switching element and the second semiconductor switching element; and circuitry configured to:

cause an operation mode of the multilevel power converter to transition to a standby mode in which power conversion is not performed between the positive terminal and the AC terminal based on a predetermined condition; and generate and output a gate signal that puts at least one of the third semiconductor switching element or the second semiconductor switching element into a conducting state or a switching state in the standby mode.

2. The multilevel power conversion system according to claim 1, further comprising:

an AC switch connected between the AC terminal and the AC power supply or the AC load, wherein the circuitry is further configured to generate and output the gate signal by being configured to generate and output a gate signal that puts at least one of the third semiconductor switching element or the second semiconductor switching element into a conducting state or a switching state in a case where the AC switch is disconnected and the operation mode is the standby mode.

3. The multilevel power conversion system according to claim 1, wherein the circuitry is further configured to generate and output the gate signal by being configured to generate and output a gate signal that puts both of the first semiconductor switching element and the fourth semiconductor switching element into a non-conducting state in a case where the operation mode is the standby mode.

4. The multilevel power conversion system according to claim 1, wherein the circuitry is further configured to generate and output the gate signal by being configured t generate and output a gate signal for operating the multilevel power converter based on a voltage command value of zero for causing the AC terminal to output a voltage approximately equal to a voltage of the DC neutral point in a case where the operation mode is the standby mode.

5. The multilevel power conversion system according to claim 1, wherein the circuitry is further configured to generate a voltage command value based on a current command value of zero for causing the AC terminal of the multilevel power converter to output a current of approximately 0 in a case where the operation mode is the standby mode, and the circuitry is further configured to generate and output the gate signal by being configured to generate and output a gate signal for operating the multilevel power converter based on the generated voltage command value.

6. Circuitry of a multilevel power conversion system comprising:

a multilevel power converter that comprises:

a positive terminal and a negative terminal connected to a DC power supply or a DC load;

a plurality of DC capacitors connected in series via a DC neutral point between the positive terminal and the negative terminal;

an AC terminal connected to an AC power supply or an AC load;

a first semiconductor switching element and a fourth semiconductor switching element connected in series via the AC terminal between the positive terminal and the negative terminal to have the same polarity;

a first freewheeling diode and a fourth freewheeling diode respectively connected in inverse parallel to the first semiconductor switching element and the fourth semiconductor switching element;

a third semiconductor switching element and a second semiconductor switching element connected in series between the DC neutral point and the AC terminal to have reverse polarity; and a third freewheeling diode and a second freewheeling diode respectively connected in inverse parallel to the third semiconductor switching element and the second semiconductor switching element, wherein the circuitry is configured to:

cause an operation mode of the multilevel power converter to transition to a standby mode in which power conversion is not performed between the positive terminal and the AC terminal based on a predetermined condition; and generate and output a gate signal that puts at least one of the third semiconductor switching element or the second semiconductor switching element into a conducting state or a switching state in the standby mode.

* * * * *